United States Patent [19]

Uken et al.

[11] Patent Number: 5,193,132
[45] Date of Patent: Mar. 9, 1993

[54] METHOD OF COUPLING LIGHT VIA A COUPLER ON A FIBER OPTIC LIGHT GUIDE USING PHASE SPACE MATCHING

[75] Inventors: William D. Uken, Fremont; William T. Link, Berkeley, both of Calif.

[73] Assignee: Raynet Corporation, Menlo Park, Calif.

[21] Appl. No.: 768,644

[22] PCT Filed: May 2, 1990

[86] PCT No.: PCT/US90/02449

§ 371 Date: Sep. 30, 1991

§ 102(e) Date: Sep. 30, 1991

Related U.S. Application Data

[63] Continuation-in-part of Ser. No. 503,064, Mar. 29, 1990, abandoned, which is a continuation of Ser. No. 346,185, May 2, 1989, abandoned.

[51] Int. Cl.$^5$ .......................... G02B 6/26; G02B 6/42
[52] U.S. Cl. ........................................... 385/32; 385/34
[58] Field of Search .............................. 385/32, 33, 34

[56] References Cited

U.S. PATENT DOCUMENTS

| | | | |
|---|---|---|---|
| 4,696,535 | 9/1987 | Saha | 385/32 |
| 4,768,854 | 9/1988 | Campbell et al. | 385/32 |
| 4,792,202 | 12/1988 | Zucker et al. | 385/32 |
| 4,824,199 | 4/1989 | Uken | 385/32 |
| 5,037,170 | 8/1991 | Uken et al. | 385/32 |
| 5,046,798 | 9/1991 | Yagui et al. | 385/34 |
| 5,119,462 | 6/1992 | Matsubara et al. | 385/34 |
| 5,127,074 | 6/1992 | Watanabe et al. | 385/34 |

*Primary Examiner*—John D. Lee
*Assistant Examiner*—Robert E. Wise
*Attorney, Agent, or Firm*—Dennis E. Kovach

[57] ABSTRACT

A coupler for a fiber optic light waveguide has phase space matching optics to increase coupling efficiency. The acceptance phase space of the fiber optic waveguide has two components for light in two orthogonal planes. One of the phase space plots has a straight spine and the other has a bent spine. The phase space matching optics include a graded index lens optically coupled to the phase of a light emitting diode, in the case of a write coupler, which alters the emitted light phase space at a reference plane of the emitted light to match, at the reference plane, the acceptance phase space component having the straight spine. Another lens takes the output light from the graded index lens and alters the phase space further to match the phase space component having the bent spine. Also disclosed is a method for measuring phase space and a system using write and read couplers and a pair of buses for bidirectional communication of information between a plurality of users and a central facility such a telephone central switching office.

27 Claims, 27 Drawing Sheets

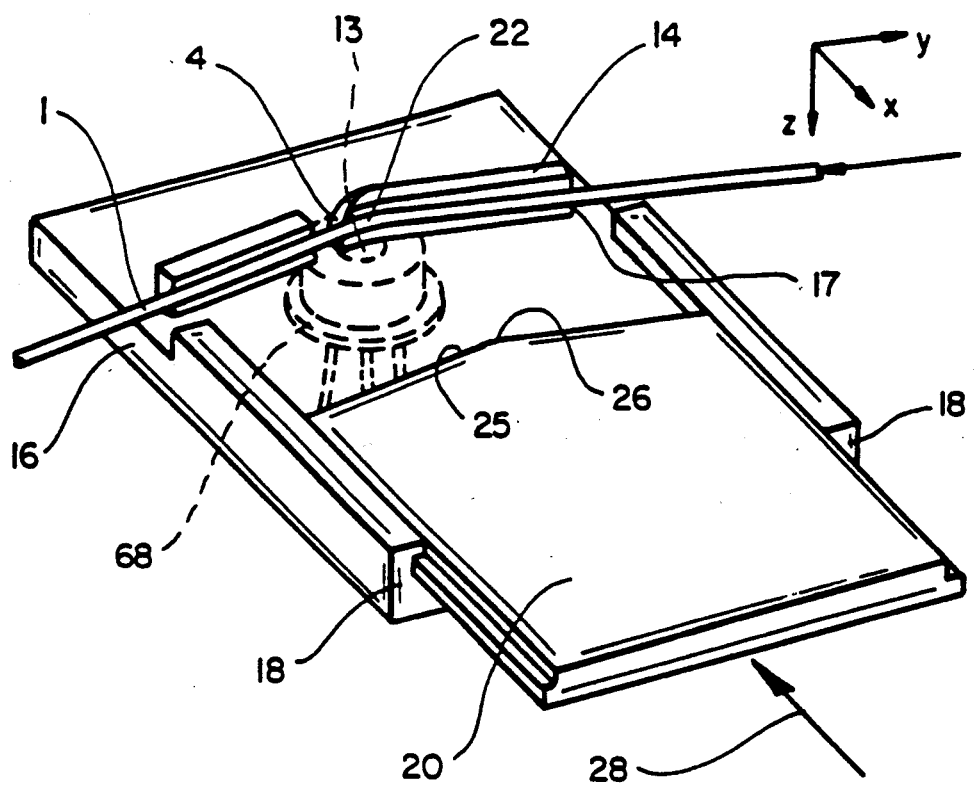
FIG_1
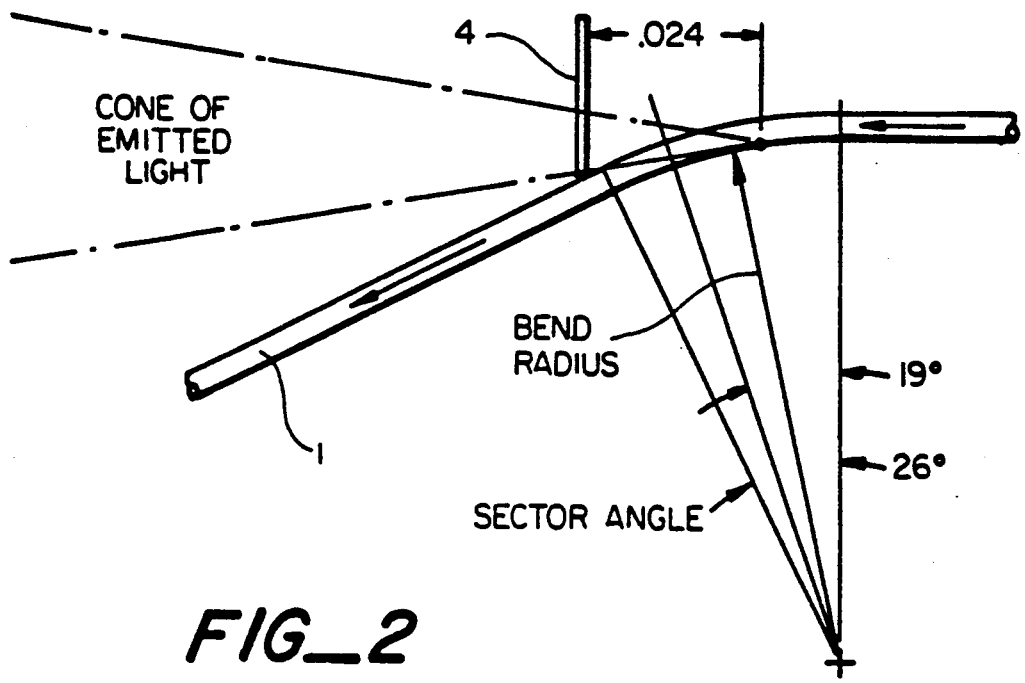
FIG_2

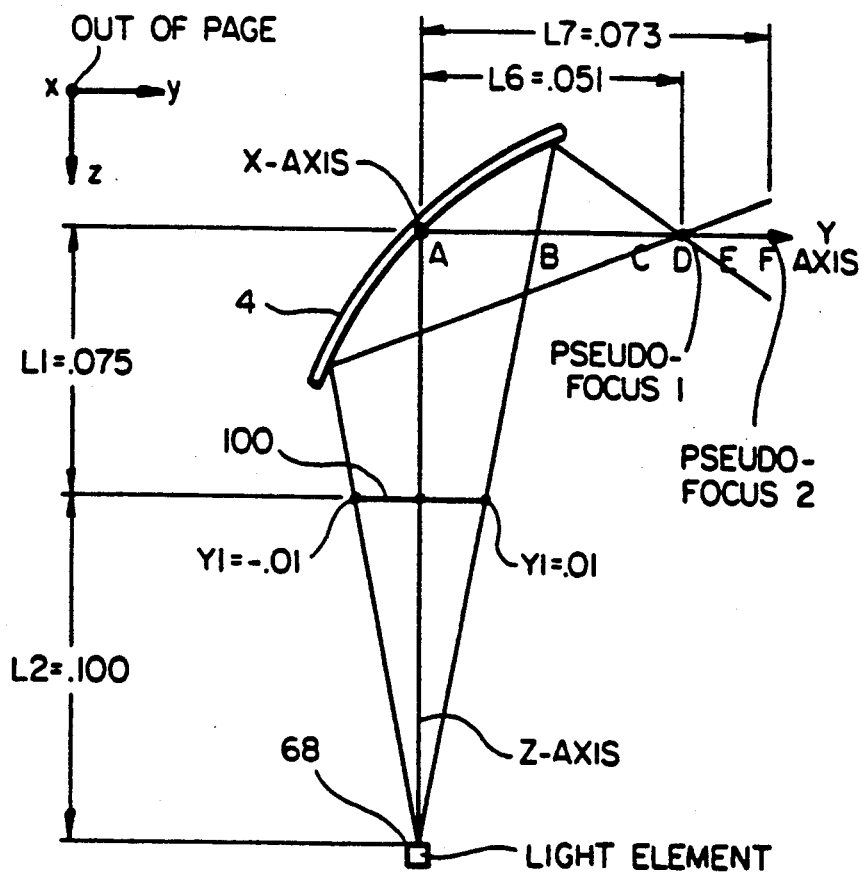
FIG_3
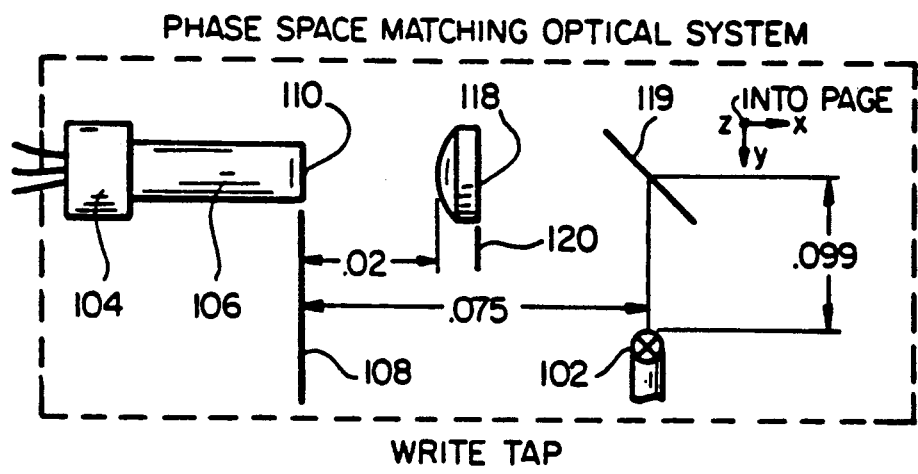
FIG_5

|   | A | B |
|---|---|---|
| 1 | INPUT VALUES | |
| 2 | X1max | 0.010 |
| 3 | Y1max | 0.010 |
| 4 | L1 | 0.075 |
| 5 | L2 | 0.100 |
| 6 | | |
| 7 | | |
| 8 | DEPENDENT TERMS | |
| 9 | | |
| 10 | X'1 | 0.100 |
| 11 | Y'1 | 0.100 |
| 12 | | |
| 13 | CONSTANTS | |
| 14 | | |
| 15 | | |
| 16 | | |
| 17 | | |
| 18 | | |
| 19 | | |
| 20 | | |
| 21 | | |
| 22 | | |
| 23 | | |
| 24 | L6 | 0.100 |
| 25 | L7 | 0.073 |
| 26 | | |
| 27 | a200 | -9.70 |
| 28 | a100 | 0 |
| 29 | a020 | -12.95 |
| 30 | a010 | 1.00 |
| 31 | a002 | -0.00001 |
| 32 | a001 | -1.00 |
| 33 | a210 | 130 |
| 34 | | |
| 35 | | |
| 36 | | |
| 37 | | |
| 38 | a220 | -1340 |
| 39 | a011 | 0 |
| 40 | a201 | -3.0 |
| 41 | a030 | 77 |
| 42 | a040 | -700 |
| 43 | a400 | -810 |

FIG_4

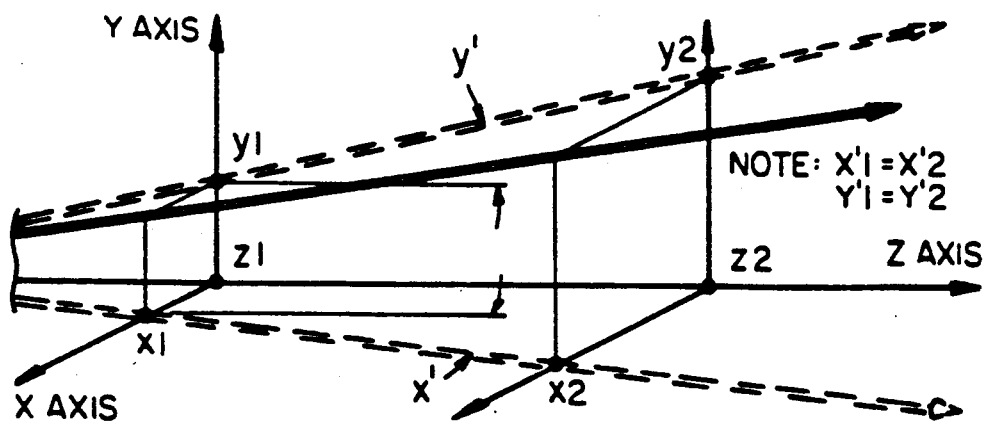
FIG_6
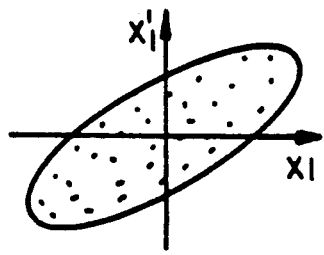
FIG_7
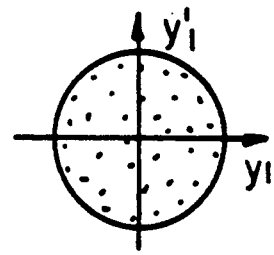
FIG_8
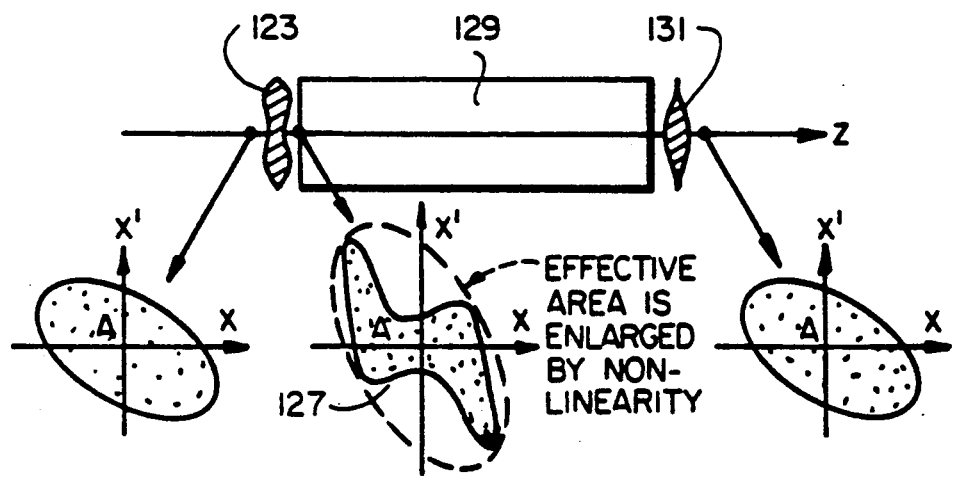
FIG_9

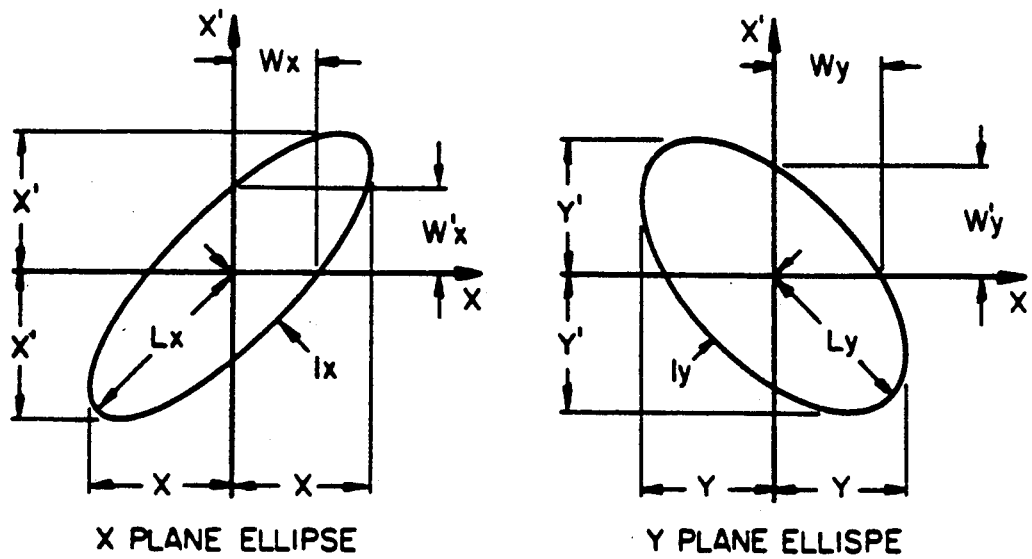

X PLANE ELLIPSE      Y PLANE ELLISPE

FIG_10      FIG_11

(A)   $x = X\cos(\theta + \psi x)$ (B)   $x' = X'\sin(\theta - \psi x)$ (C)   $A_x = \pi X X' \cos 2\psi x$ (D)   $A_x = \pi L_x l_x$ (E)   $W_x/X = W'_x/X' = \cos 2\psi x$ (F)   $y = Y\cos(\theta + \psi y)$ (G)   $y' = Y'\sin(\theta - \psi y)$ (H)   $A_y = \pi Y Y' \cos 2\psi y$ (I)   $A_y = \pi L_y l_y$ (J)   $W_y/Y = W'_y/Y' = \cos 2\psi x$ IN THESE EQUATIONS $\theta$ IS A PARAMETER WHICH WHEN VARIED FROM 0 TO $2\pi$ DRAWS OUT THE ELLIPSE. X, X' & $\psi x$ ($\pi/4 \leq \psi x \leq \pi/4$) DEFINE THE X PLANE ELLIPSE & Y, Y' & $\psi y$ ($\pi/4 \leq \psi y \leq \pi/4$) DEFINE THE Y PLANE ELLIPSE.

FIG_12

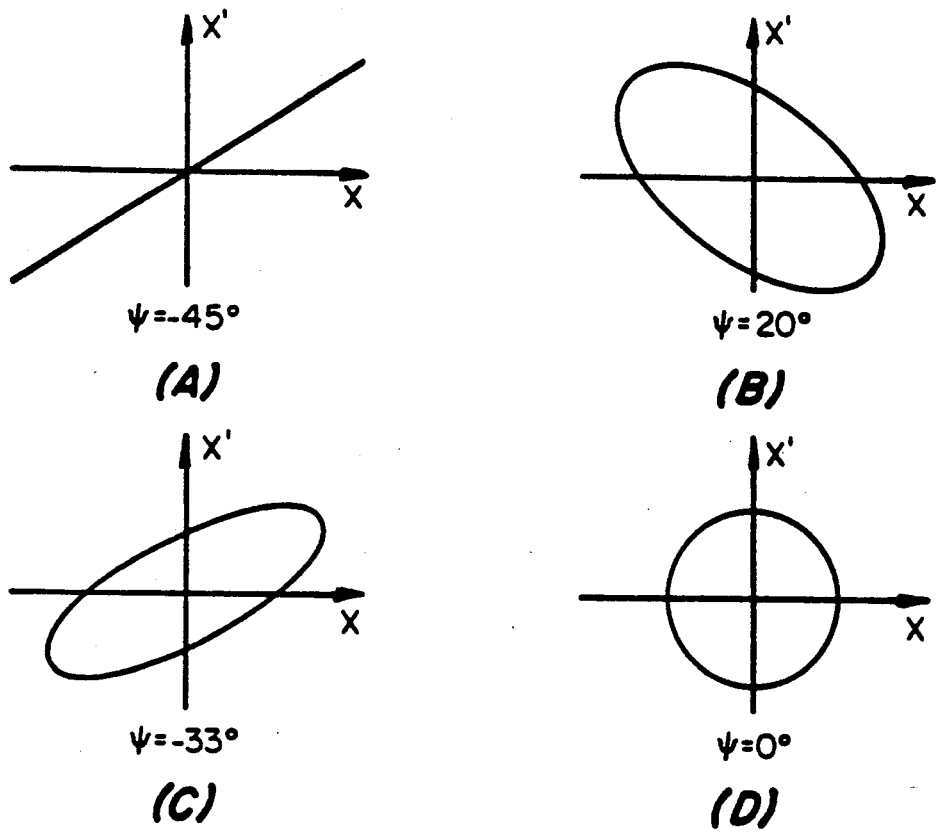
FIG_13
FIG_14
FIG_15
$X2 = aX1 + bX'1$
$X'2 = cX1 + dX'1$
FIG_16
$$\begin{vmatrix} X2 \\ X'2 \end{vmatrix} = \begin{vmatrix} a & b \\ c & d \end{vmatrix} \begin{vmatrix} X1 \\ X'1 \end{vmatrix}$$
FIG_17

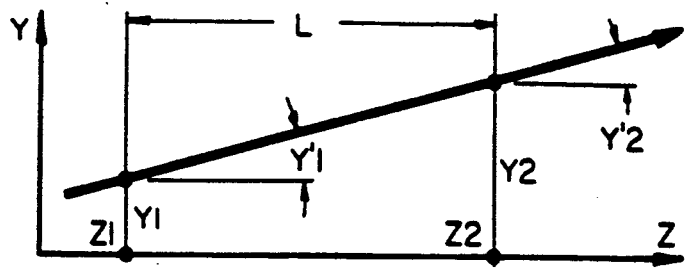

FIG_18

$$\left.\begin{array}{l}\text{DRIFT SPACE L}\\Y2 = Y1 + LY'1\\Y'2 = \phantom{Y1 + L}Y'1\end{array}\right\} \text{OR} \quad \begin{vmatrix}Y2\\Y'2\end{vmatrix} = \begin{vmatrix}1 & L\\0 & 1\end{vmatrix}\begin{vmatrix}Y1\\Y'1\end{vmatrix}$$

FIG_19

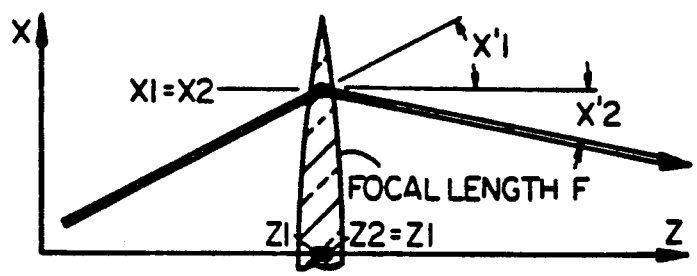

FIG_20

$$\left.\begin{array}{l}\text{VERY THIN LENS, F}\\X2 = \phantom{-\tfrac{1}{F}}X1\\X'2 = -\tfrac{1}{F}X1 + X'1\end{array}\right\} \text{OR} \quad \begin{vmatrix}X2\\X'2\end{vmatrix} = \begin{vmatrix}1 & 0\\-\tfrac{1}{F} & 1\end{vmatrix}\begin{vmatrix}X1\\X'1\end{vmatrix}$$

FIG_21

FIG_22
FIG_23
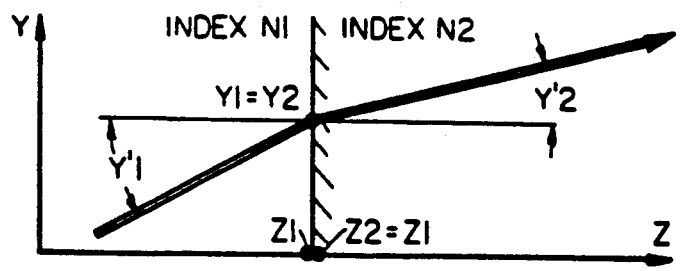
FIG_24
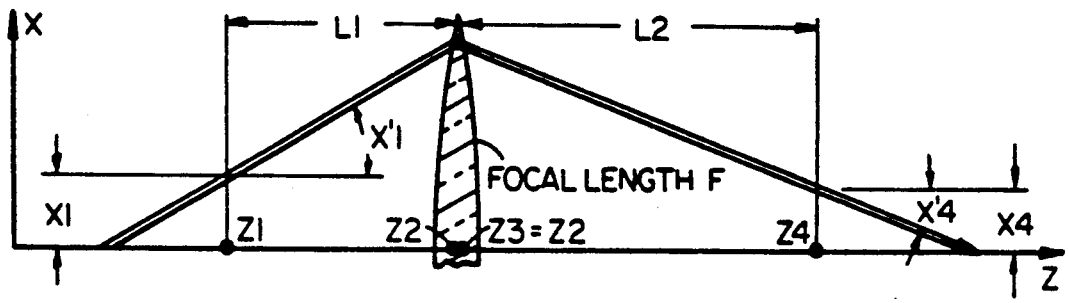
FIG_25

$$\begin{vmatrix} X4 \\ X'4 \end{vmatrix} = \begin{vmatrix} 1 & L2 \\ 0 & 1 \end{vmatrix} \begin{vmatrix} 1 & 0 \\ -\frac{1}{F} & 1 \end{vmatrix} \begin{vmatrix} 1 & L1 \\ 0 & 1 \end{vmatrix} \begin{vmatrix} X1 \\ X'1 \end{vmatrix} = \begin{vmatrix} 1 & L2 \\ 0 & 1 \end{vmatrix} \begin{vmatrix} 1 & L1 \\ -\frac{1}{F} & 1-\frac{L1}{F} \end{vmatrix} \begin{vmatrix} X1 \\ X1 \end{vmatrix}$$

$$\begin{vmatrix} X4 \\ X'4 \end{vmatrix} = \begin{vmatrix} 1-L2/F & L1+L2-L1L2/F \\ -1/F & 1-L1/F \end{vmatrix} \begin{vmatrix} X1 \\ X'1 \end{vmatrix}$$

FIG_26

$$\begin{vmatrix} a & b \\ c & d \end{vmatrix} \times \begin{vmatrix} A & B \\ C & D \end{vmatrix} = \begin{vmatrix} aA+bC & aB+bD \\ cA+dC & cB+dD \end{vmatrix}$$

$$\begin{vmatrix} 1 & 3 \\ 2 & -1 \end{vmatrix} \times \begin{vmatrix} 4 & 0 \\ -1 & -2 \end{vmatrix} = \begin{vmatrix} 1 & -6 \\ 9 & 2 \end{vmatrix}$$

$$\begin{vmatrix} 2 & 1 \\ 7 & 6 \end{vmatrix} \underbrace{\begin{vmatrix} 1 & 3 \\ 2 & -1 \end{vmatrix} \begin{vmatrix} 4 & 0 \\ -1 & -2 \end{vmatrix}}_{\text{ALWAYS START FROM THIS SIDE}} = \begin{vmatrix} 2 & 1 \\ 7 & 6 \end{vmatrix} \begin{vmatrix} 1 & -6 \\ 9 & 2 \end{vmatrix} = \begin{vmatrix} 11 & -10 \\ 61 & -30 \end{vmatrix}$$

FIG_27

$$\mathrm{Det}\begin{vmatrix} a & b \\ c & d \end{vmatrix} = ad - bc$$

$$\mathrm{Det}\begin{vmatrix} -3 & 4 \\ -5 & 6 \end{vmatrix} = -18 + 20 = +2$$

$$\mathrm{Det}\begin{vmatrix} 3 & 3.3 \\ 5.1515 & 6 \end{vmatrix} = 1.00005$$

FIG_28

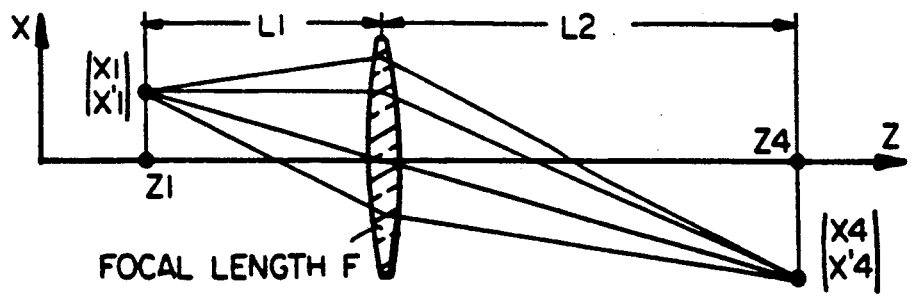
FIG_29
$$\begin{vmatrix} X4 \\ X'4 \end{vmatrix} = \begin{vmatrix} 1-L2/F & L1+L2-L1L2/F \\ -1/F & 1-L1/F \end{vmatrix} \begin{vmatrix} X1 \\ X'1 \end{vmatrix}$$
FIG_30
$$X4 = (1-\frac{L2}{F})X1 + (L1+L2-\frac{L1L2}{F})X'1$$
FIG_31
$$L1+L2-\frac{L1L2}{F}=0, \quad L2=\frac{L1 \cdot F}{L1 \cdot F} \quad OR \quad \frac{1}{L1}+\frac{1}{L2}=\frac{1}{F}$$
FIG_32
$$X4=(1-\frac{L2}{F})X1, \quad MAG=\frac{X4}{X1}=1-\frac{L2}{F}=-\frac{L2}{L1}$$
FIG_33

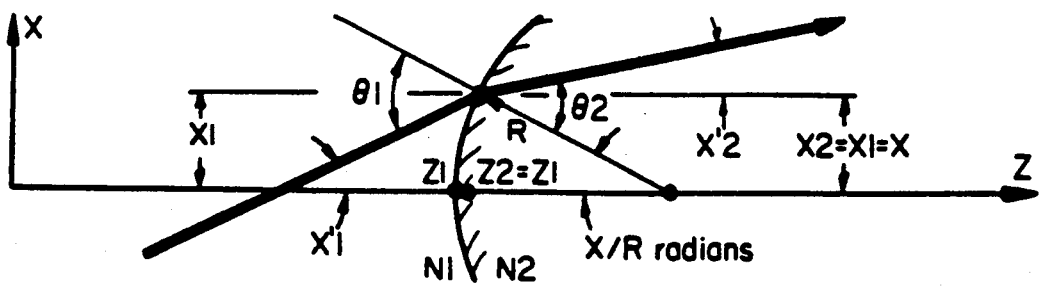
FIG_34
(A) $\theta_1 = x'_1 + X/R$
(B) $N_1 \sin\theta_1 = N_2 \sin\theta_2$ OR $N_1\theta_1 = N_2\theta_2$
(C) $x'_2 = \theta_2 - X/R$
(D) $x'_2 = -\dfrac{N_2-N_1}{N_2 R}X + \dfrac{N_1}{N_2}x'_1$ ; $X_1 = X_2 = X$
(E) $\begin{vmatrix} X_2 \\ x'_2 \end{vmatrix} = \begin{vmatrix} 1 & 0 \\ -\dfrac{N_2-N_1}{N_2 R} & \dfrac{N_1}{NR} \end{vmatrix} \begin{vmatrix} X_1 \\ x'_1 \end{vmatrix}$
FIG_35
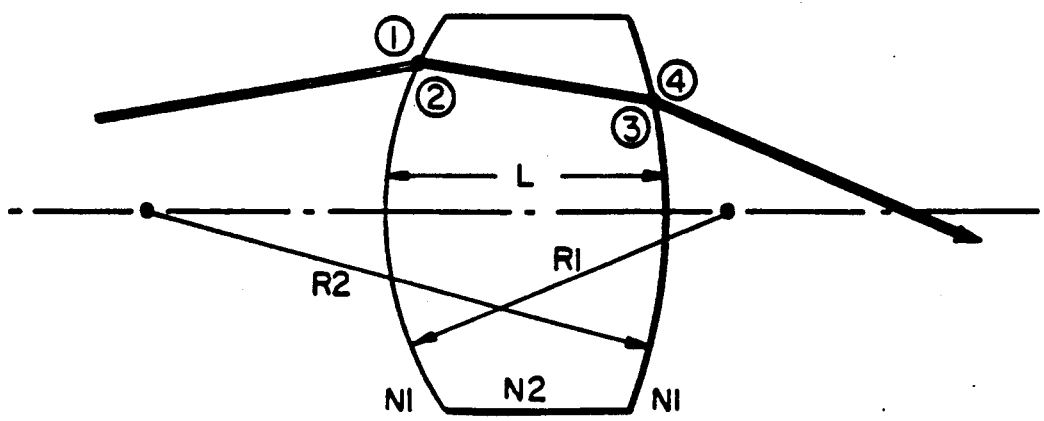
FIG_36

$$\begin{vmatrix} X4 \\ X'4 \end{vmatrix} = \begin{vmatrix} 1 & 0 \\ -(\frac{N1-N2}{N1R2}) & \frac{N2}{N1} \end{vmatrix} \begin{vmatrix} 1 & L \\ 0 & 1 \end{vmatrix} \begin{vmatrix} 1 & 0 \\ -(\frac{N2-N1}{N2R1}) & \frac{N1}{N2} \end{vmatrix} \begin{vmatrix} X1 \\ X'1 \end{vmatrix}$$

$$= \begin{vmatrix} 1 & 0 \\ -(\frac{N1-N2}{N1R2}) & \frac{N2}{N1} \end{vmatrix} \begin{vmatrix} 1-L\frac{N2-N1}{N2R1} & L\frac{N1}{N2} \\ -(\frac{N2-N1}{N2R1}) & \frac{N1}{N2} \end{vmatrix} \begin{vmatrix} X1 \\ X'1 \end{vmatrix}$$

FIG_37

$$\begin{vmatrix} X4 \\ X'4 \end{vmatrix} = \begin{vmatrix} 1-L\frac{N2-N1}{N2R1} & L\frac{N1}{N2} \\ -\frac{N2-N1}{N1}(\frac{1}{R1}-\frac{1}{R2})-\frac{L(N1-N2)^2}{N1N2R1R2} & 1-L\frac{N1-N2}{N2R2} \end{vmatrix} \begin{vmatrix} X1 \\ X'1 \end{vmatrix}$$

FIG_38

$$\begin{vmatrix} X4 \\ X'4 \end{vmatrix} = \begin{vmatrix} 1-\frac{\Delta NL}{NR1} & \frac{L}{N} \\ -\Delta N(\frac{1}{R1}-\frac{1}{R2})-\frac{L(\Delta N)^2}{NR1R2} & 1+\frac{\Delta NL}{NR2} \end{vmatrix} \begin{vmatrix} X1 \\ X'1 \end{vmatrix}$$

FIG_39

THIN LENS, L=0, $\begin{vmatrix} X4 \\ X'4 \end{vmatrix} = \begin{vmatrix} 1 & 0 \\ -\Delta N(\frac{1}{R1}-\frac{1}{R2}) & 1 \end{vmatrix} = \begin{vmatrix} 1 & 0 \\ -\frac{1}{F} & 1 \end{vmatrix}$ F OF A THIN LENS AS $1/F = \Delta N(1/R1 - 1/R2)$

FOR A DOUBLE CONVEX LENS R2 IS NEGATIVE

FIG_40

$$M = \begin{vmatrix} 1 & \frac{L}{N} \\ \frac{\Delta N}{R2} & 1 + \frac{\Delta N L}{N R2} \end{vmatrix}$$
FIG_41
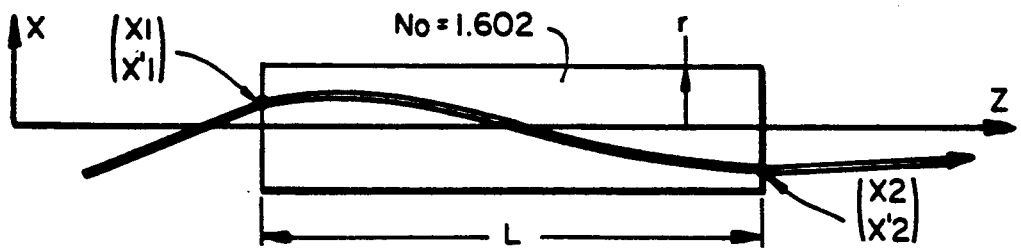
FIG_42
$$Nr = No(1 - \frac{a}{2} r^2)$$
FIG_43
$$M = \begin{vmatrix} \cos\sqrt{a}L & \frac{1}{No\sqrt{a}}\sin\sqrt{a}L \\ -No\sqrt{a}\sin\sqrt{a}L & \cos\sqrt{a}L \end{vmatrix}$$
FIG_44
$P = \sqrt{a}L/2\pi$    $\sqrt{a}L = 2\pi P$
(A)    (B)
FIG_45

$$M = \begin{pmatrix} \cos 2\pi P & \dfrac{1}{2\pi P N_0} \sin 2\pi P \\ -\dfrac{2\pi P N_0}{L} \sin 2\pi P & \cos 2\pi P \end{pmatrix}$$

FIG_46

$$\begin{pmatrix} x_2 \\ x'_2 \end{pmatrix} = \begin{pmatrix} 1 & 0 \\ 0 & \dfrac{1}{N_2} \end{pmatrix} \begin{pmatrix} a & b \\ c & d \end{pmatrix} \begin{pmatrix} 1 & 0 \\ 0 & N_1 \end{pmatrix} \begin{pmatrix} x_1 \\ x'_1 \end{pmatrix} = \begin{pmatrix} a & bN_1 \\ \dfrac{c}{N_2} & \dfrac{N_1}{N_2} \end{pmatrix} \begin{pmatrix} x_1 \\ x'_1 \end{pmatrix}$$

FIG_47

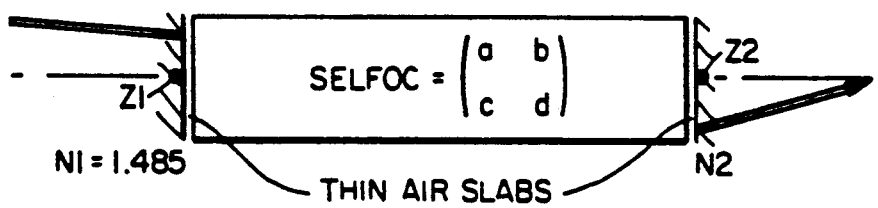

FIG_48

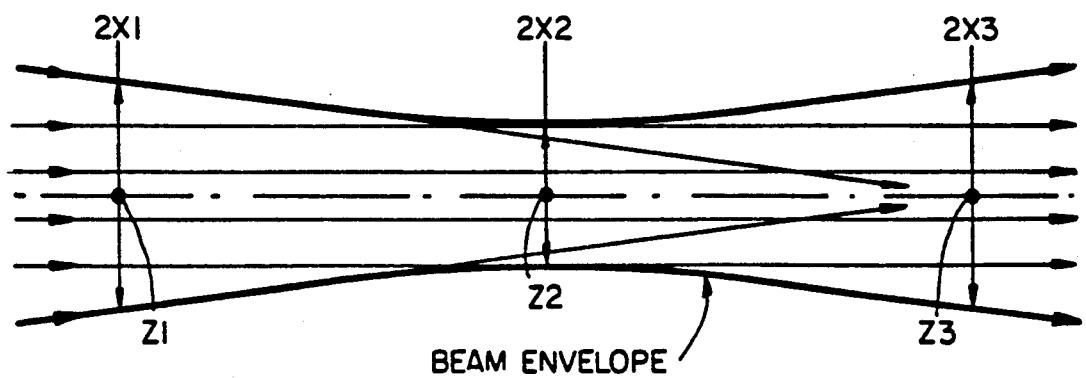

FIG_49

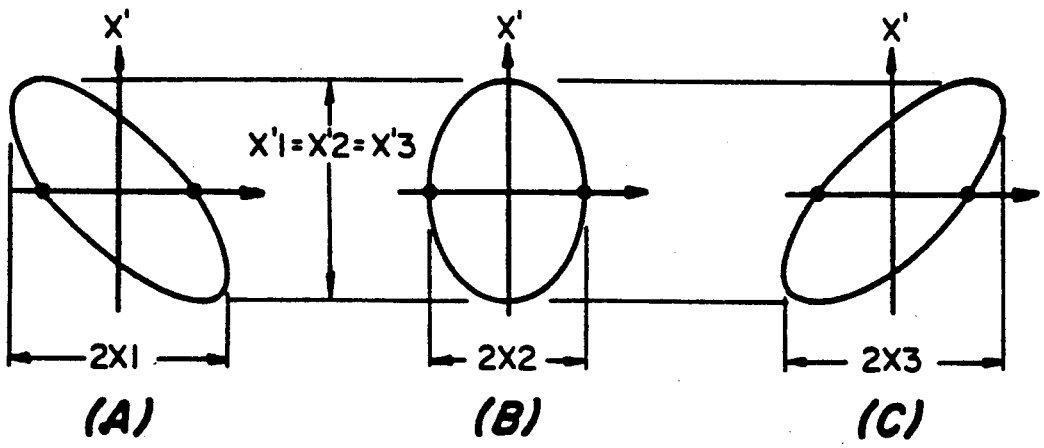

FIG—50

ASSUME A $\phi$ SPACE ELLIPSE $X1, X'1, \psi$ CHANGES INTO $X2, X'2, \psi2$ BY PASSING THROUGH VARIOUS TRANPORT ELEMENTS SUMMARIZED IN A SINGLE TRANSPORT MATRIX $\begin{pmatrix} a & b \\ c & d \end{pmatrix}$. THEN:

(A) $X2^2 = a^2 X1^2 + b^2 X'1^2 - 2ab X1 X'1 \sin 2\psi 1$ (B) $X'2^2 = c^2 X1^2 + d^2 X'1^2 - 2cd X1 X'1 \sin 2\psi 1$ (C) $X2 X'2 \sin 2\psi 2 = (ad+bc) X1 X'1 \sin 2\psi 1 - ac X1^2 - bd X'1^2$ (D) $A = \pi X1 X'1 \cos 2\psi 1 = \pi X2 X'2 \cos 2\psi 2$

FIG—51

FOR A THIN LENS, $\begin{pmatrix} a & b \\ c & d \end{pmatrix} = \begin{pmatrix} 1 & 0 \\ -\frac{1}{F} & 1 \end{pmatrix}$

FIG—52

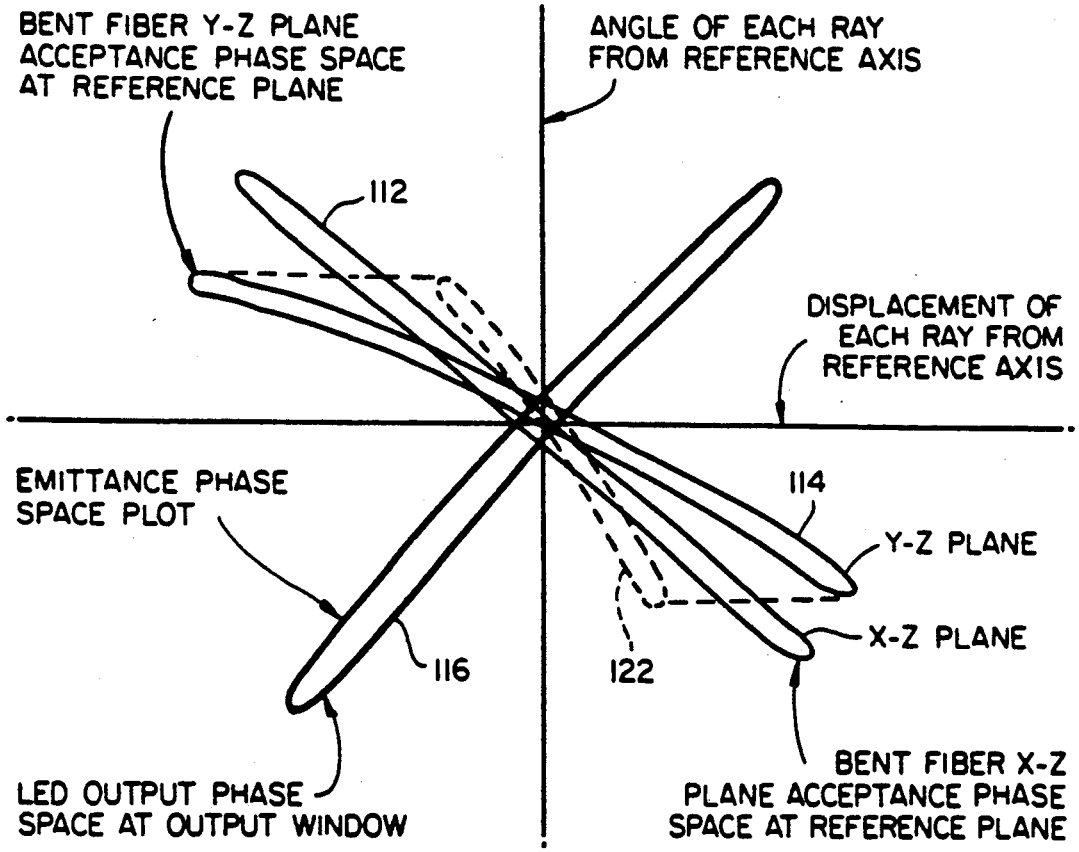
FIG_53
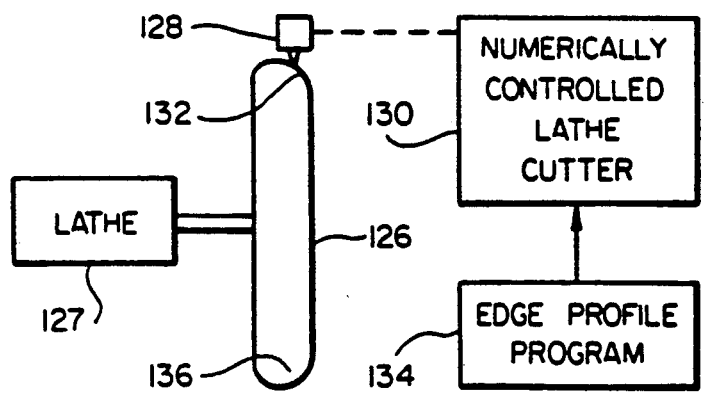
FIG_55

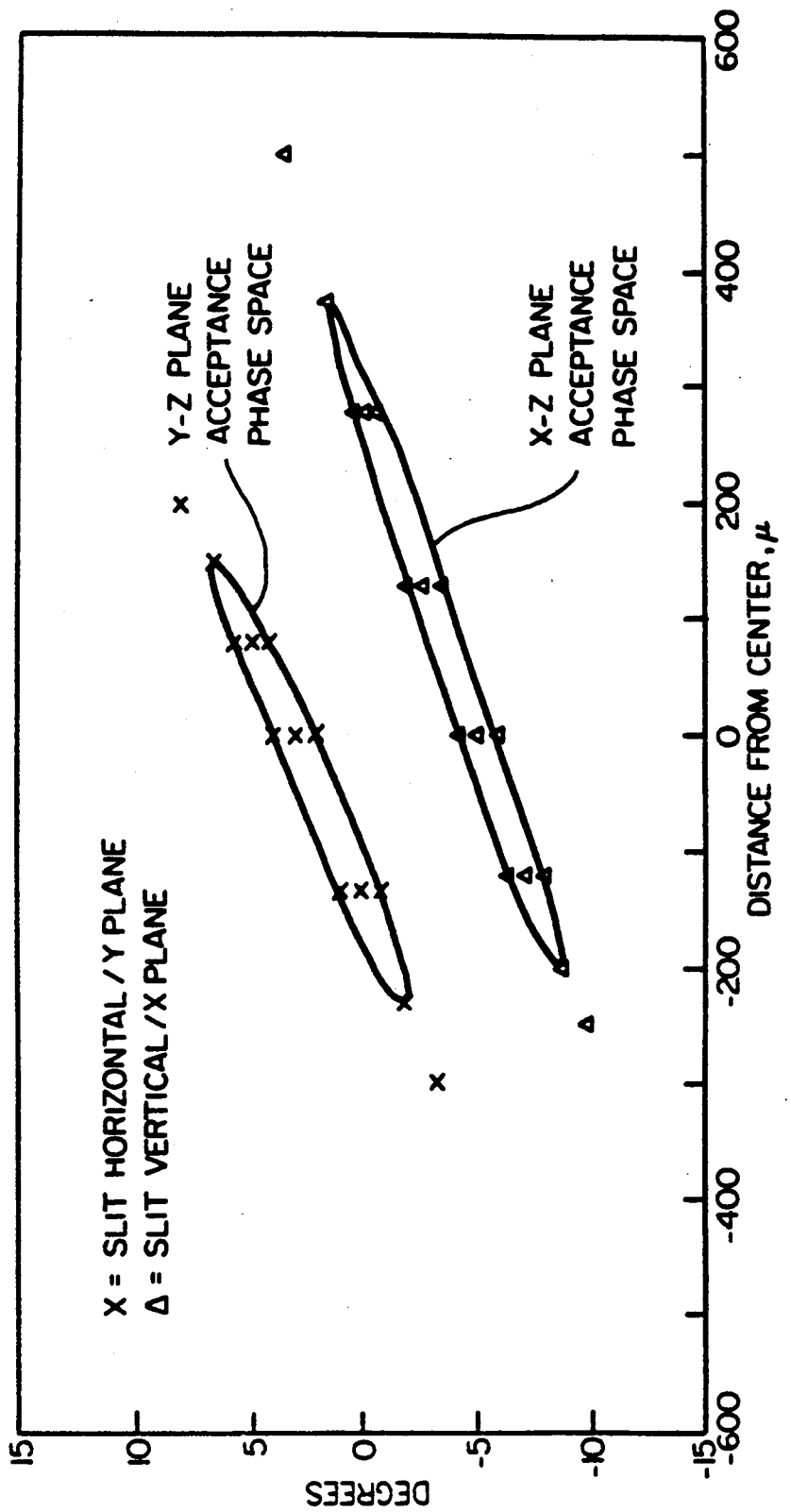
FIG_54

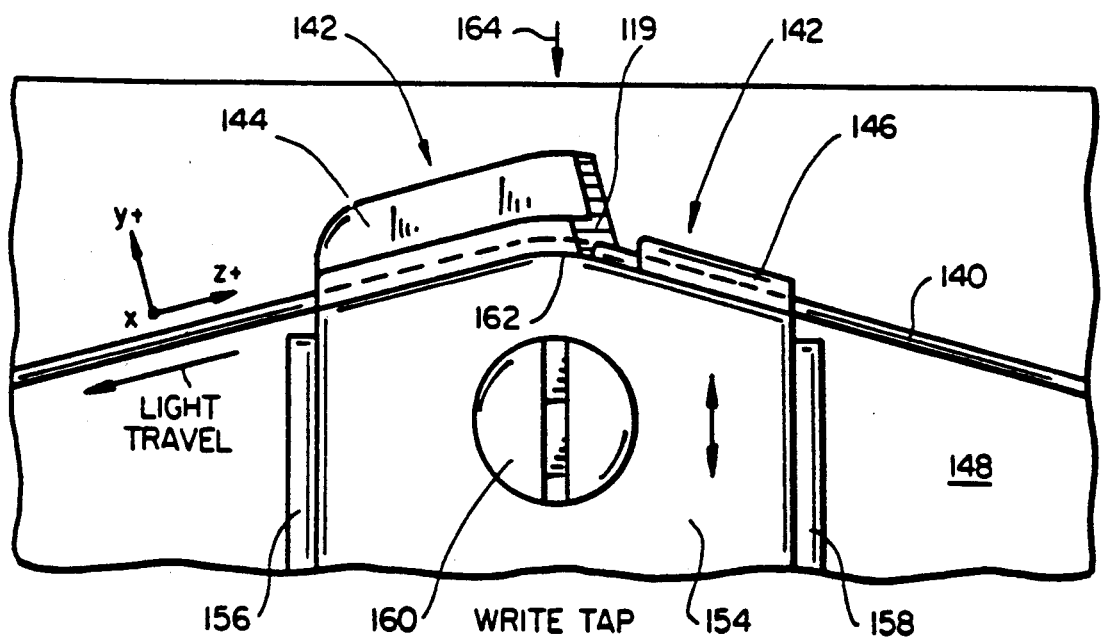
FIG_56
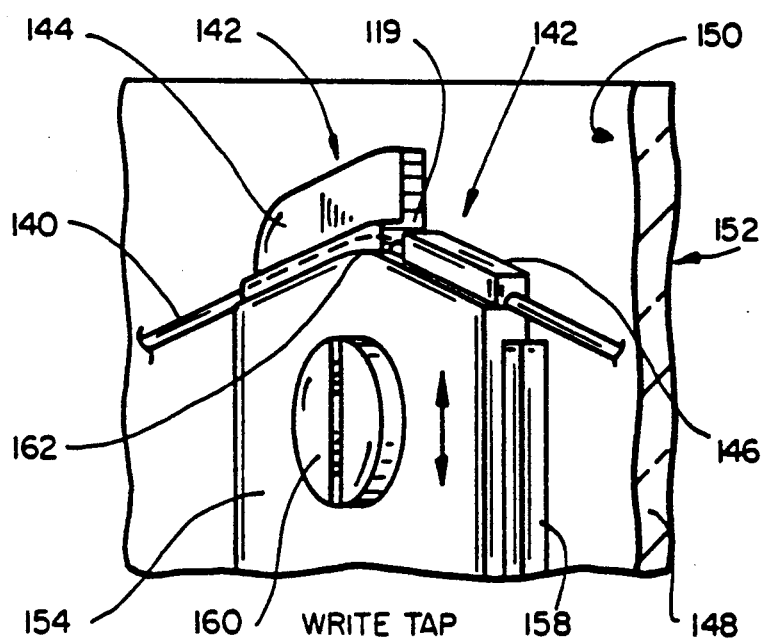
FIG_57

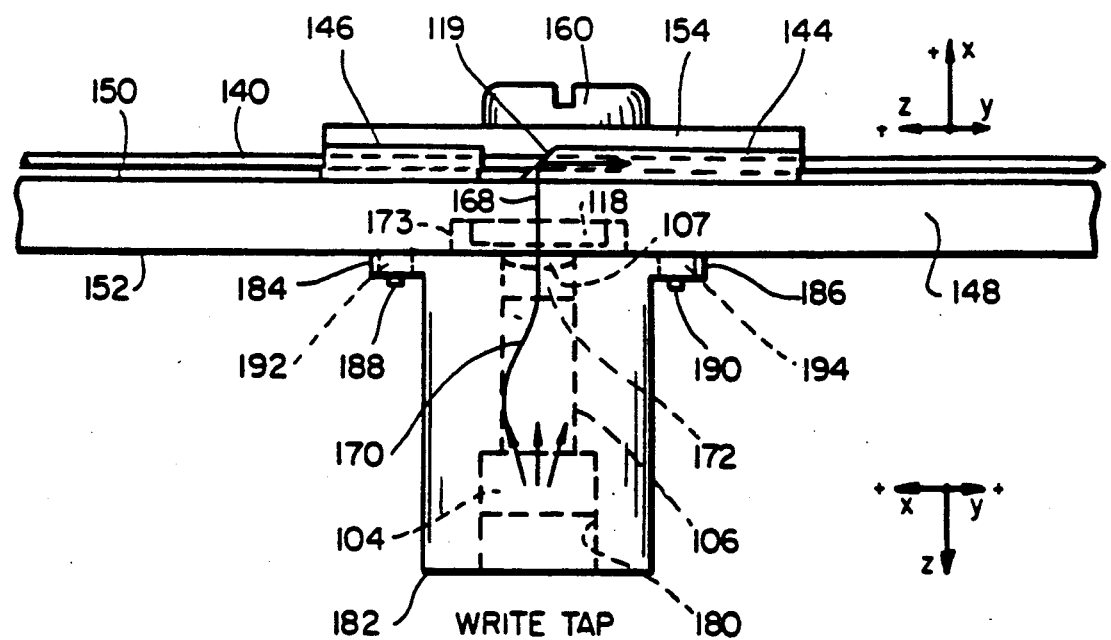
FIG_58
FIG_59

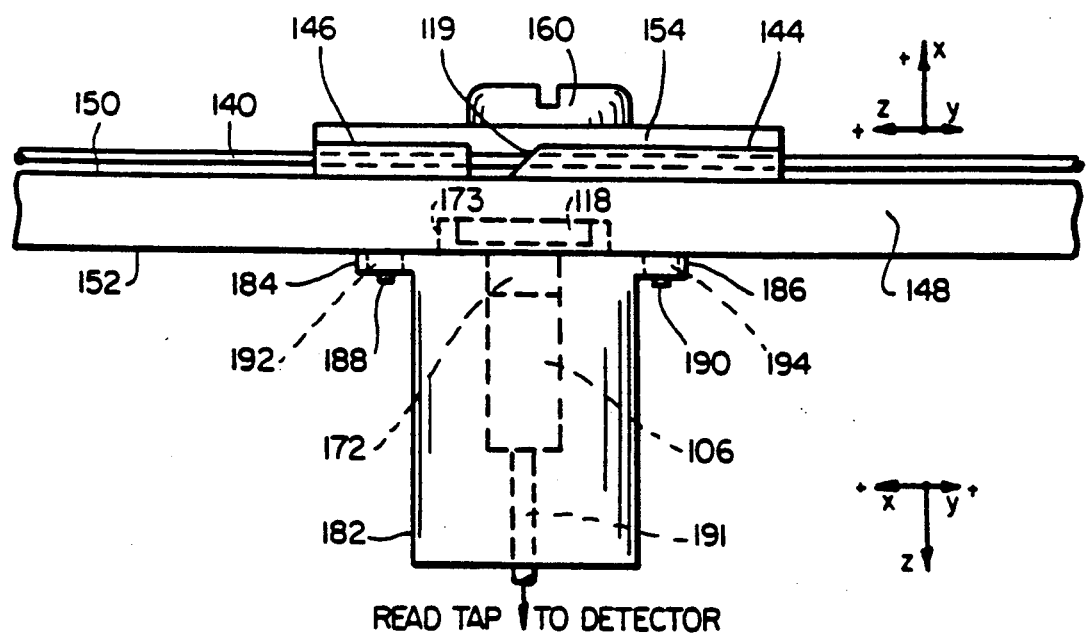
FIG_60
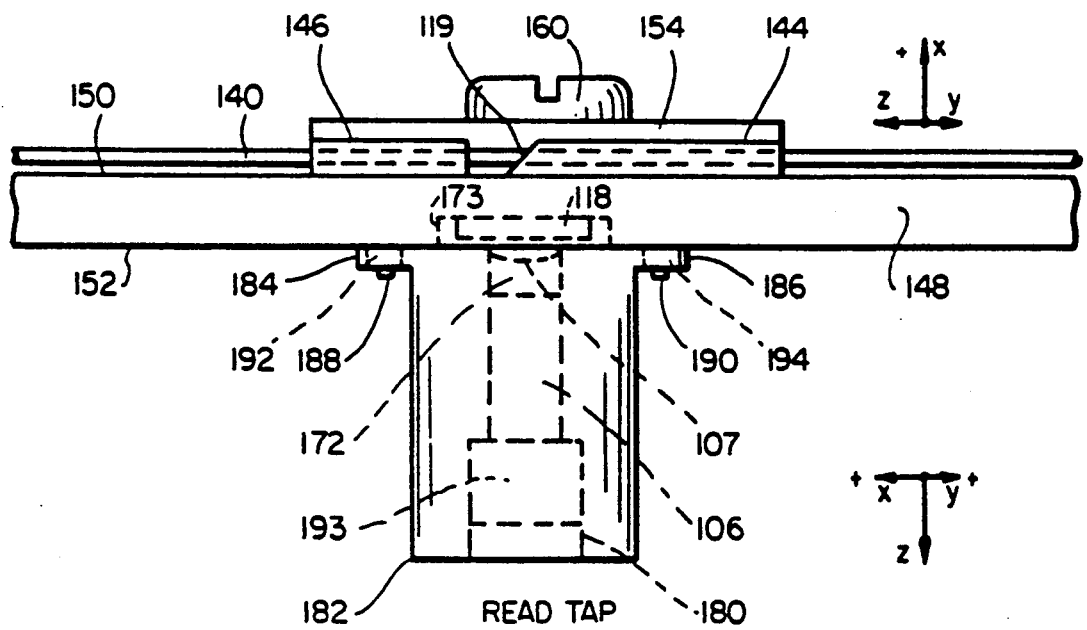
FIG_61

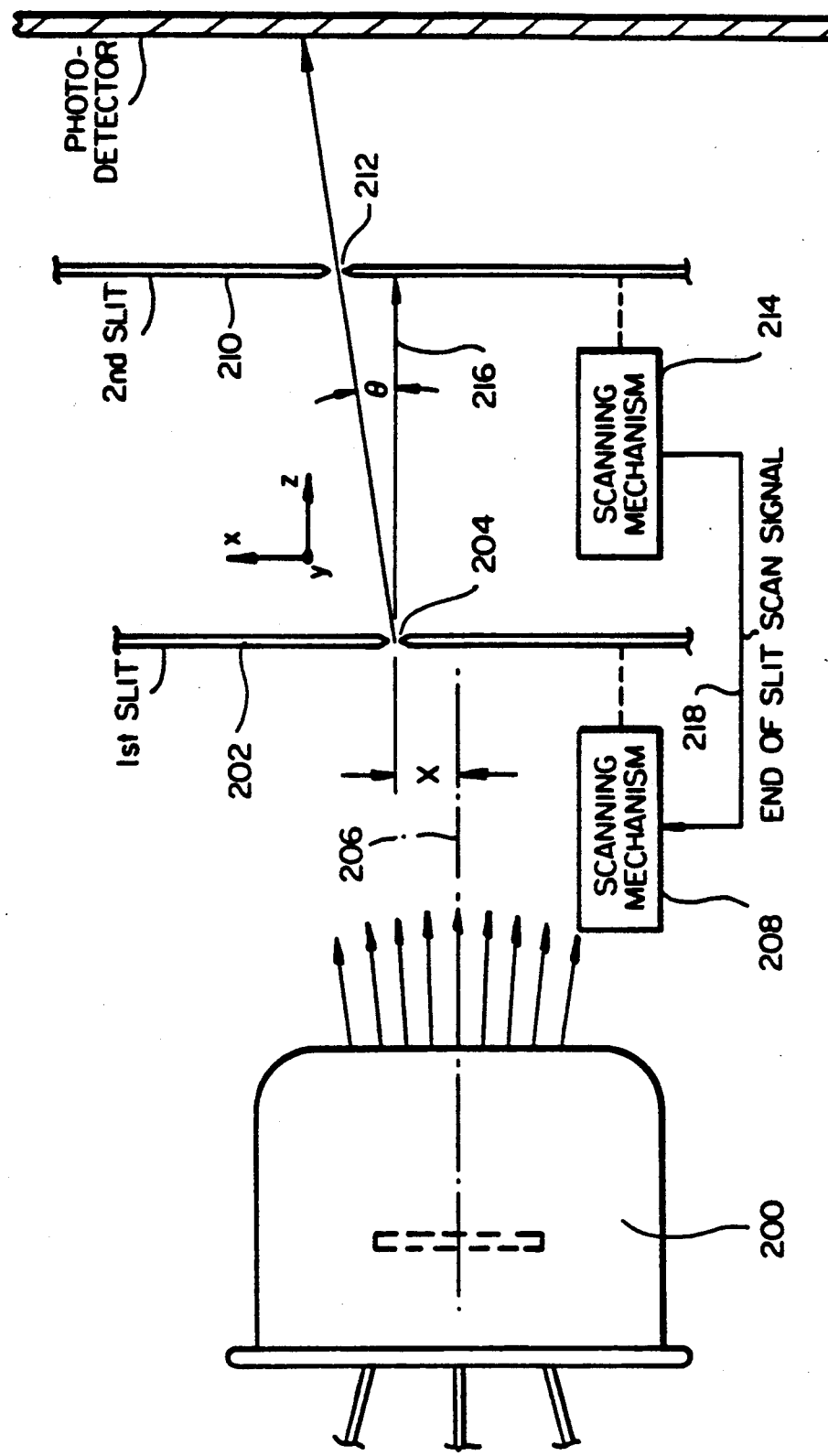
FIG_62

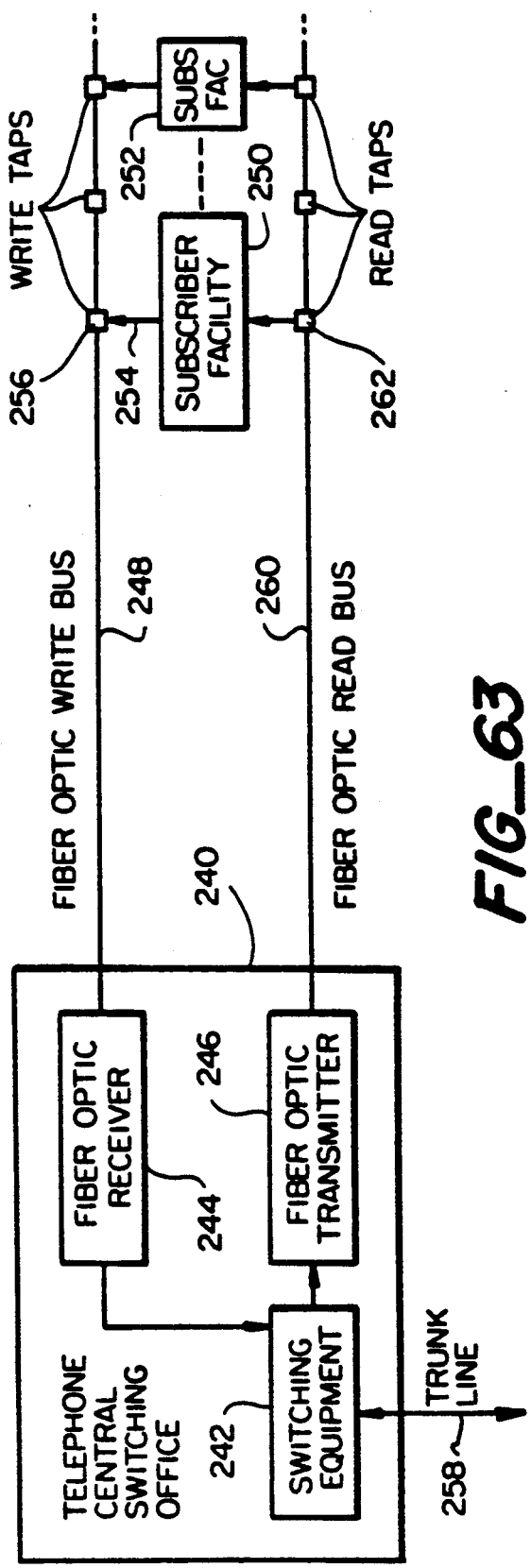
FIG_63

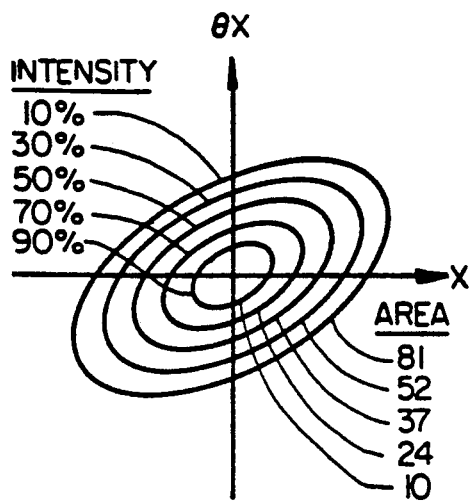
FIG_64
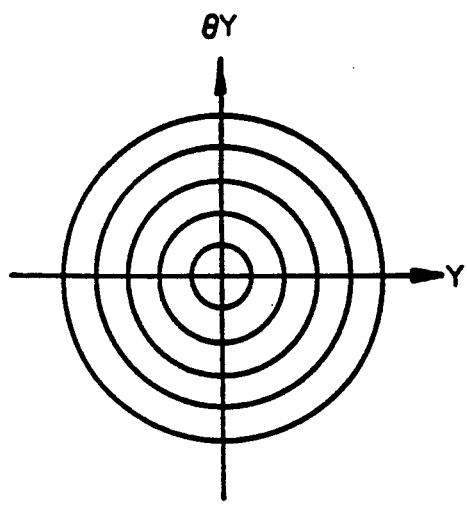
FIG_65
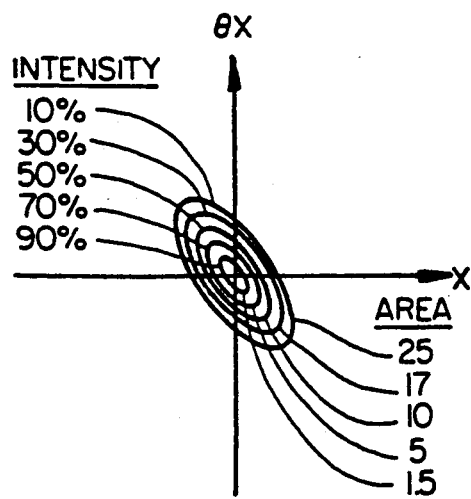
FIG_66
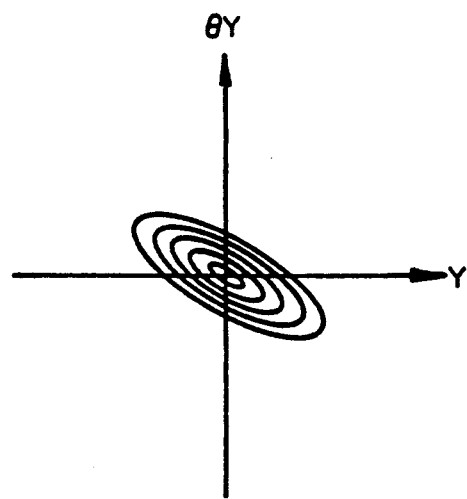
FIG_67

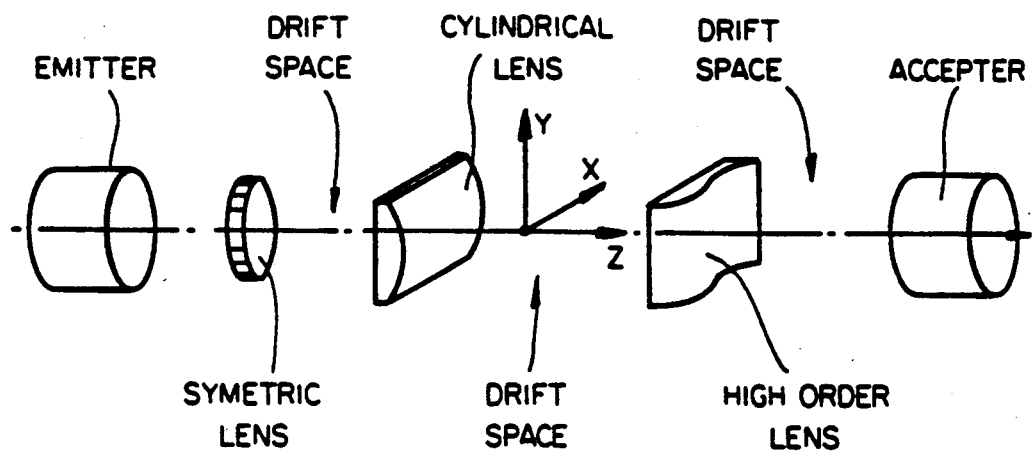
*FIG_68*
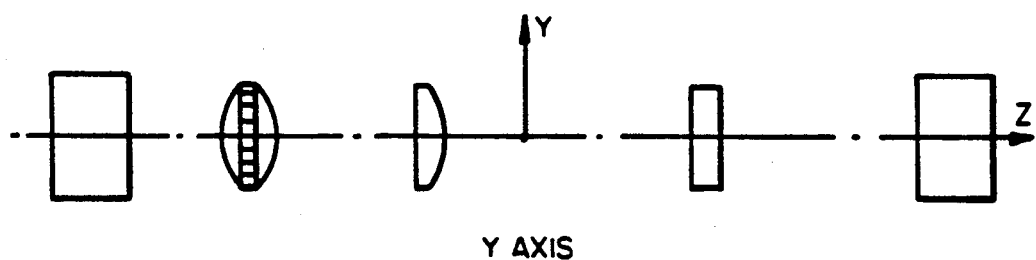
Y AXIS
*FIG_69*
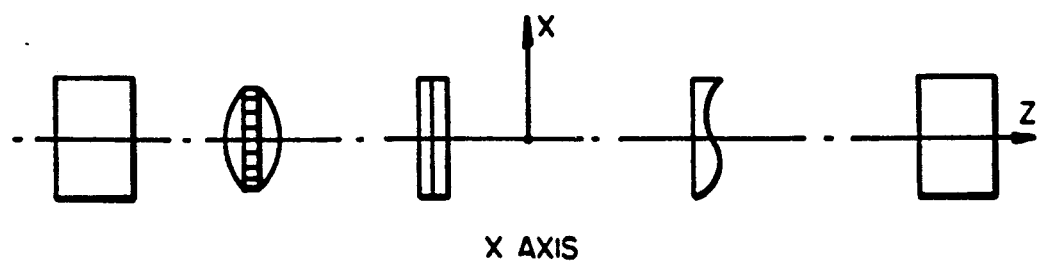
X AXIS
*FIG_70*

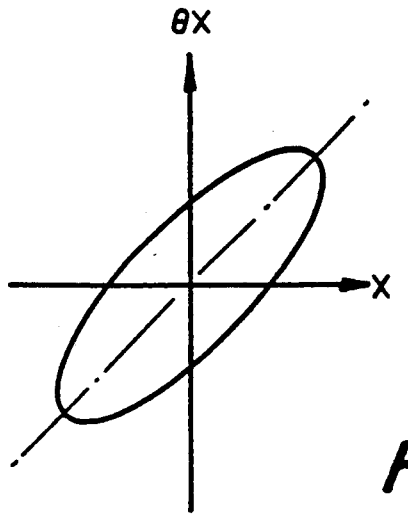
FIG_71A
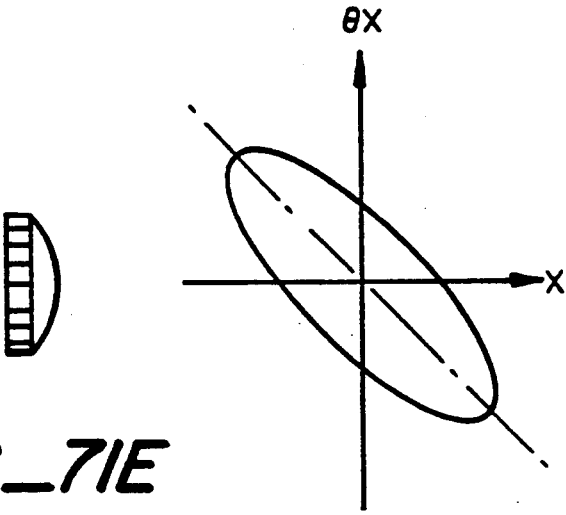
FIG_71E
FIG_71C
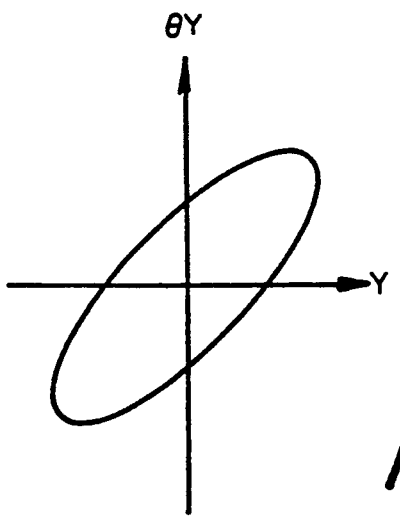
FIG_71B
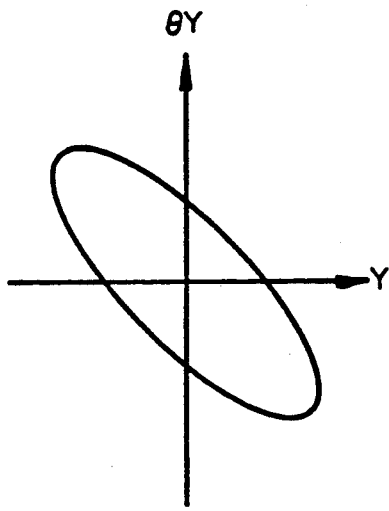
FIG_71F
FIG_71D

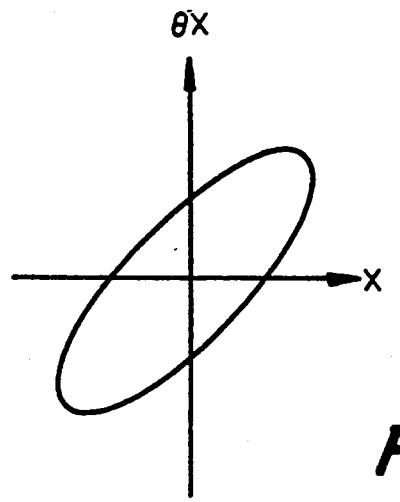
FIG_72A
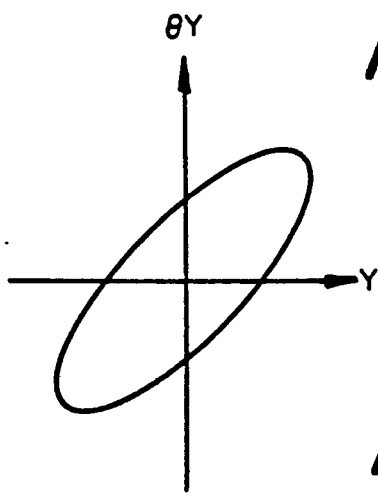
FIG_72B
FIG_72E
FIG_72F
FIG_72G
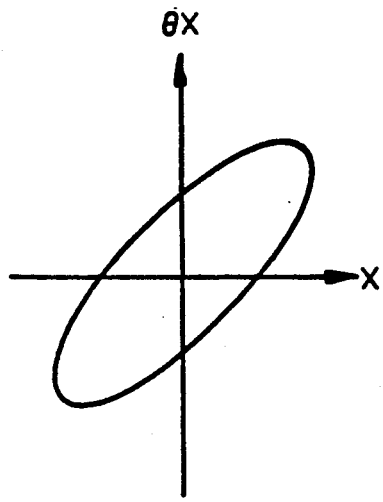
FIG_72C
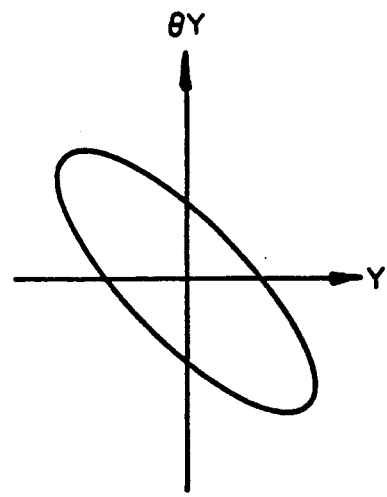
FIG_72D
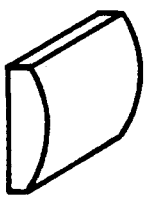

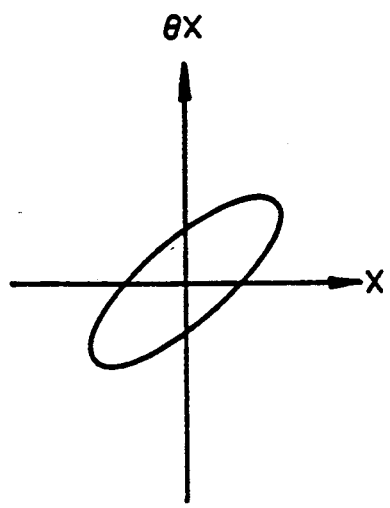
FIG_73A
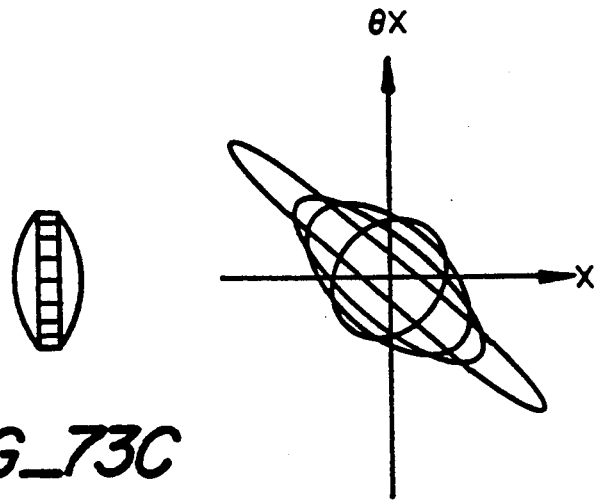
FIG_73C
FIG_73B
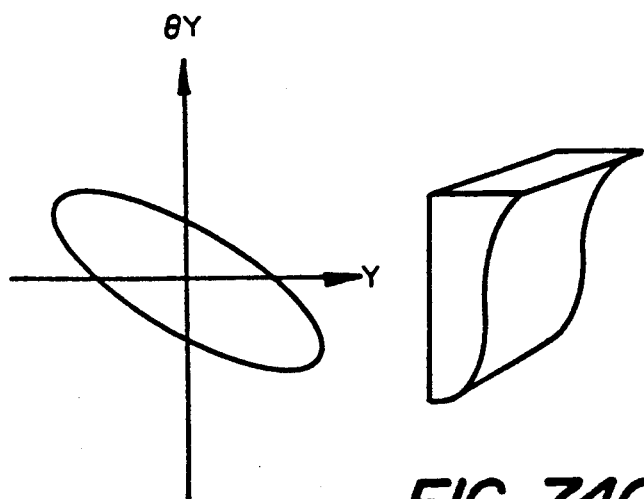
FIG_74A
FIG_74C
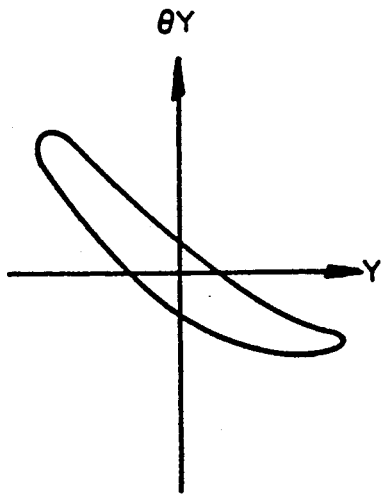
FIG_74B

METHOD OF COUPLING LIGHT VIA A COUPLER ON A FIBER OPTIC LIGHT GUIDE USING PHASE SPACE MATCHING

This is a continuation-in-part of U.S. application Ser. No. 07/503,064 filed Mar. 29, 1990, abandoned, which is a continuation of U.S. Ser. No. 07/346,185 filed May 2, 1989, abandoned, the disclosures of which are incorporated herein by reference.

The present invention relates to an optical fiber coupler utilizing phase space techniques to improve injection and extraction efficiency, methods for making same, and networks usable therewith.

Numerous methods have been proposed in the prior art for distributing information using an optical fiber, preferred methods including star, ring, and bus architectural networks. Numerous methods have also been proposed for coupling light between an optical fiber core and an electro-optic transducer.

Miller, GB 2,126,749B and Dakin et al. "Experimental Studies into the Non-Invasive Collection and Distribution of Data on a Fiber-Optic Monomode Bus" propose designing a read optical fiber bus using couplers whereby light is withdrawn through a side of the optical fiber by passing the light through a coating of the fiber. Miller collects the light from the bus fiber by disposing a photodetector at an end of a curved and grooved light pipe disposed around the bus fiber, and Dakin et al. collects the light by tightly pressing a polymeric fiber with part of its cladding removed against a curved portion of the bus fiber. Such techniques are disadvantageous since the couplers are complicated in design, are difficult to install in the field, and are not sufficiently efficient. Typical fiber optic bus installations have what are called flux budgets. This refers to the amount of energy in the fiber versus the number of couplers. When tight flux budgets are mandated by network design, the inefficiencies of the prior art coupler designs require fewer couplers per bus resulting in fiber optic bus structures being less competitive with conventional technologies.

Goell et al., U.S. Pat. No. 3,982,123 at FIGS. 5A and 5B discloses an optical fiber read coupler whereby an exposed glass cladding of a bent optical fiber portion is glued to a top of a photodetector. Such couplers are disadvantageous since the strength of the fiber is adversely affected by removal of the outer protective buffer. Further, rather small light coupling efficiencies are obtained by simply using epoxy to secure a bent optical fiber onto a top surface of a photodetector. In addition, the optical fiber is not releasable from the coupler.

Cross, U.S. Pat. No. 4,270,839 discloses a coupler for an optical fiber whereby the fiber is bent in air, and downstream from the bent portion of the optical fiber a straight section of the optical fiber is glued within a straight light pipe which thereafter is curved and has a light detector at a remote end thereof. Again, such couplers disadvantageous since they have been found to yield relatively low light coupling efficiencies, and because the optical fiber is not releasable from the light pipe once attached.

Campbell et al., U.S. Pat. No. 4,728,169; Campbell et al., U.S. Pat. No. 4,768,854; Campbell et al., U.S. Pat. No. 4,747,652, and Uken, U.S. Pat. No. 4,741,585 and 4,824,199, the disclosures of which are all incorporated herein by reference, disclose several advantageous kinds of couplers for either injecting light into or withdrawing light from optical fibers.

Gerndt, German Patent Application Number P 24 09 455.1, published Sep. 4, 1975, discloses an optical coupler using a bent fiber and a lens to guide the light emitted from the fiber to a detector. No mention of phase space alteration is made.

There continues to be a need for more efficient couplers which are also mechanically simple in structure, easy to install and easy to maintain.

Accordingly, it is an object of the present invention to eliminate the above-noted drawbacks and to provide an optical method of altering a direction of light propagation using phase space techniques to provide more efficient coupling between two optical devices, one of which is optimally a waveguide.

These and other objects are achieved by utilizing phase space optical techniques to improve coupling efficiency in a coupler which bends an optical fiber waveguide in a plane to enable light emission from the fiber and light injection into the fiber. Preferably the plane of the bend is flat. In the preferred embodiment, the apparatus of the invention utilizes a flat mirror for redirecting light from a light emitting device into the a core of the optical fiber. The light emitted from the light emitting device passes through a specially designed lens system optimally containing astigmatic and nonastigmatic lens. These lens are precisely configured and precisely located relative to the light emitting device and the bend in the fiber so as to alter the shape and orientation of the phase space of a selected intensity contour plot of the emittance phase space of the emitted light. The selection of lens configuration and placement is made so that the selected intensity contour of the emittance phase space has its shape and orientation altered so as to substantially or exactly match the shape and orientation of a second selected intensity contour of the acceptance phase space of the optical fiber or other waveguide. The two intensity contours of the emittance phase space and the acceptance phase space are selected so as to have as close as possible to the same area although the intensities of the two contours may be and usually are different.

In a write coupler where information bearing light is injected into the fiber, the light emitting device can be a laser, light emitting diode etc. In the case of a read coupler where information bearing light is extracted from the fiber, the acceptance device can be a photodetector or a pigtail optical fiber that couples the emitted light to a photodetector.

The specially designed lens system is necessary to alter the phase space characteristics of a selected intensity contour of the light emitted from the light emitter, in the case of a write coupler, to match the different acceptance phase space characteristics of another intensity contour of the bent fiber in two orthogonal planes. The two selected intensity contours are measured at the same reference plane. The meaning of phase space and the orthogonal planes will be clarified in the detailed description below. Because of the nature of the bend in the optical fiber, the emerging beam is not round and will have different phase space characteristics in two orthogonal planes that cut through the beam. This is because the projection of the fiber onto a first orthogonal plane curves while the projection in another orthogonal plane does not curve. Thus, the acceptance phase space for light rays in the plane of the curved projection, i.e., those rays which will be captured into a guided mode by the fiber in the case of a write coupler, has a curved spine. The acceptance phase space for the light rays in the orthogonal plane having the straight projection has a straight spine. For maximum coupling efficiency, i.e., maximum "launch" or capture efficiency of energy emitted from the light emitter and captured by the fiber, the lens system must alter the shape and orientation of the selected intensity contour of the phase space of the light emerging from the light emitter to have the same or substantially the same shape and orientation as the selected intensity contour of the acceptance phase space of the target waveguide at the same reference plane for light in the two orthogonal planes of interest.

Generally, the reference plane can be defined to be anywhere between the fiber and light element being coupled to the fiber. In a preferred embodiment, it is arbitrarily defined to be the backplane of the coupler substrate, i.e., the undersurface plane 108 of the substrate closest to the light element 68 in FIG. 1 and parallel to the Y-Z plane containing the bent centerline of the fiber.

Preferably, this alteration of the phase space is done with a first lens and drift spaces which nonastigmatically alters the shape and orientation of the phase space of the selected intensity contour of the light emerging from the light emitting device to match the shape and orientation of the selected intensity contour of the acceptance phase space of the light in the plane having the straight projection of the fiber, i.e., the straight spine elliptical component of the acceptance phase space. Then a second lens is used to astigmatically alter the shape and orientation of the light in the selected intensity contour in only one of two orthogonal planes of the emittance phase space of the light output from the first lens. That is, the phase space of the light emerging from the first lens is altered astigmatically so that the shape and orientation of the light in the selected intensity contour of the "straight" component plane of the emittance phase space is not altered, but so that light in the plane having the curved "spine", i.e., curved projection, has the shape and orientation of its phase space at the reference plane further altered so as to substantially or exactly match the shape and orientation of the selected intensity contour curved spine component of the acceptance phase space of the fiber. In an alternative embodiment, the first lens can match emittance phase space for light emitted from the light emitter to the acceptance phase space for the curved projection plane and the second lens can alter the phase space of the light output from the first lens to match the acceptance phase space for light in the straight projection plane. In yet another alternative embodiment, the order of the lens can be switched. It is only important that the various phases of the phase space alterations be done and not that they be done in any particular order. Further, the various stages of phase space alterations done by lens in the preferred embodiment can all be done simultaneously by a single reflective, specially contoured mirror or a system comprised of several specially contoured mirrors which act on the phase space of the light sequentially in any order.

As the term phase space is used herein, the X-Z plane phase space at some particular reference plane orthogonal to the Y axis means the locus of coordinate points for all light beams lying in the X-Z plane at the point of intersection between each light ray and the reference plane, each coordinate point being made up of an angle and a distance. The angle is the angle of the light ray to the Z axis and the distance is the distance along the X axis of the point of intersection of the light ray and the reference plane. A similar definition applies to Y-Z plane phase space.

The light reflector preferably has a reflectance greater than 0.5 and preferably greater than 0.95. Preferably, the input light is coupled through a side of the optical fiber utilizing a coupling medium which has an index of refraction which optimally matches the index of refraction of the buffer which is an outer surface of the optical fiber which covers the cladding.

The reflecting surface is formed in vicinity of the optical coupler and is in close proximity therewith and, in the case of a read coupler, reflects light out of the plane of the bent optical fiber portion and towards the end surface of a light element through the lens system and drift spaces. The light element can be either fiber optic pigtail coupling the exit light to a photodetector in the case of a read coupler or a light emitter such as a light emitting diode or laser in the case of a write coupler for light injection into the fiber. In any case, the light emitter or the light detector can be substantially displaced from the coupler of the invention by utilizing a pigtail optical fiber light element which facilitates testing of the apparatus prior to permanent installation and after placing a bus optical fiber within the coupler.

The apparatus of the invention further includes means for bending the optical fiber which is releasable therefrom which also facilitates testing and repairs. This releasable mechanism releasably clamps the fiber into a bent groove to place an appropriate bend in the fiber thereby allowing light to escape. When a coupler needs to be repaired or replaced, the bus fiber is then released from the groove and the coupler can be worked on as desired.

Since the light element is disposed outside the plane of the optical fiber bend, the bend profile of the optical fiber can be set for optimum coupling efficiency and is not required to be unnecessarily further modified so as to accommodate mechanical constraints imposed by placement and size of the light element, which is sometimes much larger than the fiber core.

The apparatus according to the teachings of the invention is most suitable for use in a serial manner on an optical fiber for creating either a read or a write bus. Typically, one fiber optic bus is used to bring all signals to be delivered to subscribers from a central office location (or remote extension thereof) to the subscriber locations where each subscriber has a single read coupler coupling light out of the bus. This bus is called the read bus. Another fiber optic light guide, the write bus, is coupled to a write coupler at the location of each subscriber. Each write coupler is used to couple light into the write bus, this light carrying information from the subscriber to the central office. Of course those skilled in the art will appreciate that the optical couplers of the invention have multiple other uses beyond use in the telephone network or in a bus configuration.

The invention includes an apparatus for coupling light between a light emitting device and a target optical device, the light emitting device emitting light having an emittance intensity phase space plot on a reference surface representable by a first plurality of intensity contours, the target device having an acceptance intensity phase space plot on the reference surface representable by a second plurality of intensity contours defining those light rays which will be captured by the target device, comprising:
- the light emitting device for emitting light;
- the target optical device;
- an optical path of guiding at least some of the emitted light to the target optical device;
- means for altering a direction of propagation of the emitted light so that the altered emitted light has an altered emittance intensity phase space plot on the reference surface representable by a third plurality of intensity contours and so that a first major axis of the altered plot substantially overlaps a first major axis of the acceptance plot on a first plot plane.

Preferably either the target optical device comprises a bent optical fiber which is to have light from the light emitting device injected thereinto by passing the light through a side of the fiber, or the light emitting device comprises a bent optical fiber which is bent about a radius of curvature sufficiently small and sector angle sufficiently large so that light propagating therewithin radiates outward at the bend by passing through a side of the fiber.

Optimally the major axes are substantially aligned, and the altering means alters the direction of the emitted light so that a first minor axis of the altered plot substantially overlaps a first minor axis of the acceptance plot, the first minor and major axes being substantially perpendicular to one another on the first plot plane, with an aspect ratio of the first minor and major axes of the altered plot being substantially equal to an aspect ratio of the first minor and major axes of the acceptance plot, and further with the altering means altering the direction of propagation of the emitted light so that the altered plot is mapped onto the acceptance plot and with their maximum intensities substantially coinciding.

More preferably the altering means alters the direction of propagation of the emitted light so that a second major axis on the altered plot substantially overlaps a second major axis of the acceptance plot, the second major axes being located on a second plot plane, the second plot plane being orthogonal to the first plot plane, the altering means further altering the direction of the emitted light so that a second minor axis of the altered plot substantially overlaps a second minor axis of the acceptance plot, the second minor axes being substantially perpendicular to the second major axes and being located on the second plot plane, with an aspect ratio of the second minor and major axes of the altered plot being substantially equal to an aspect ratio of the second minor and major axes of the acceptance plot, with the second major axes of the altered and acceptance plots being curved.

Preferably the altering means includes at least one third or higher order lens which imposes a third or higher order correction factor to the direction of propagation of the emitted light.

The invention also includes an apparatus for coupling light between a light emitting device and a target optical device, comprising:
- the light emitting device for emitting light;
- the target optical device;
- an optical path for guiding at least some of the emitted light to the target optical device;
- means for altering a direction of propagation of the emitted light, the altering means including at least one third or higher order corrective lens, at least one of the devices comprising a bent optical fiber whereby light passes through a side of the fiber at a bend.

In addition, the invention includes a telecommunications system, comprising:
- at least one optical fiber;
- a head end connected to the optical fiber;
- an optical coupler connected to the optical fiber, the optical coupler bending the optical fiber so as to allow light to be coupled between an electro-optic device and a core of the bent optical fiber so as to allow signals to be transported between the electro-optic device and the head end, one of the electro-optic device and the bent optical fiber emitting light having an emittance intensity phase space plot on a reference surface representable by a first plurality of intensity contours, the other of the electro-optic device and the bent optical fiber having an acceptance intensity phase space plot on the reference surface representable by a second plurality of intensity contours defining those light rays which will be captured by the target device;
- means for altering a direction of propagation of the emitted light so that the altered emitted light has an altered emittance intensity phase space plot on the reference surface representable by a third plurality of intensity contours and so that a first major axis of the altered plot substantially overlaps a first major axis of the acceptance plot on a first plot plane.

Finally, methods used in the foregoing apparatuses are also included within the scope of the invention.

More specifically, the invention includes a method of optimizing the optical coupling efficiency between two optical devices one of which is a waveguide, comprising:
- determining the intensity contours in the emittance phase space of a light-emitting device;
- determining the intensity contours in the acceptance phase space of a target optical device;
- selecting an intensity contour in said emittance phase space and an intensity contour in said acceptance phase space which encompass approximately the same area; and
- using predetermined phase space manipulation techniques to alter the shape and orientation of the selected intensity contour from said emittance phase space to substantially match the shape and orientation of the selected intensity contour from said acceptance phase space.

Specifically, the invention includes A method for coupling light between a light emitting device and a target optical device, comprising the steps of:
- characterizing light emitted by the light emitting device so as to define an emittance intensity phase space plot representable by a first plurality of intensity contourson a reference surface;
- characterizing for the target device an acceptance intensity phase space plot on the reference surface representable by a second plurality of intensity contours so as to define those light rays which will be captured by the target device;
- guiding light emitted by the emitting device toward the target optical device;
- altering a direction of propagation of the emitted light so that the altered emitted light has an altered emittance intensity phase space plot on the reference surface representable by a third plurality of intensity contours and so that the altered plot more closely conforms to the acceptance plot than does the emittance plot prior to such altering.

In addition, the invention includes a method of injecting light into a light waveguide, comprising:

emitting light from a light emitting device; and guiding said light to said light waveguide through an optical system which focuses light differently in two orthogonal planes in such a way as to maximize the efficiency of capture of said light by said light waveguide into a guided mode.

The invention also includes a method of coupling light emitted from a waveguide having an emittance phase space comprised of a plurality of intensity contours to a target device having an acceptance phase space comprised of a plurality of intensity contours for light rays which will be captured by said target device, comprising the steps of:

guiding said emitted light to said target device;

altering the shape and orientation of selected ones of said intensity contours of said emittance phase space to substantially match the shape and orientation of selected ones of the intensity contours of said acceptance phase space;

wherein said altering step includes the step of altering the phase space of an intensity contour of said emittance phase space which most closely matches the area of the lowest intensity contour of said acceptance phase space.

FIG. 1 illustrates a coupler embodiment of the invention which includes a member for releasably pressing an optical fiber into a groove so as to maintain a constant bend attitude therein;

FIG. 2 is a diagram of a typical cone of emitted light from a bent fiber.

FIG. 3 is a symbolic diagram of an alternative embodiment of the optical system of the coupler wherein all phase space transformations are done by a single curved mirror.

FIG. 4 is a table of the coefficients and terms for the expression which defines the curvature of the surface of the mirror 4 in FIG. 3.

FIG. 5 is a symbolic diagram of the configuration for the optical system for the preferred embodiment of a write coupler according to the teachings of the invention regarding phase space matching.

FIG. 6 is a diagram of the propagation of a single ray of light in the coordinate system which will be used to explain phase space and transport matrix concepts.

FIG. 7 is an X axis phase space plot.

FIG. 8 is a Y axis phase space plot.

FIG. 9 is a diagram of a nonlinear optical system where the shape of a phase space plot is first distorted by a nonlinear optical element and then changed back to its original shape.

FIG. 10 is a diagram that defines the parameters used to define the shape and orientation of an ellipse in the X—X' plane of a phase space plot, a shape typically used to characterize a phase space plot comprised of individual plot points for individual rays.

FIG. 11 is a diagram that defines the parameters used to define the shape and orientation of an ellipse in the Y—Y' plane of a phase space plot, a shape typically used to characterize a phase space plot comprised of individual plot points for individual rays.

FIGS. 12(A)–12(J) are the set of equations used to mathematically define an ellipse.

FIGS. 13(a) through 13(d) illustrate how the shape of an ellipse changes when the key parameters change.

FIGS. 14 and 15 are matrices used to express two points on a phase space plot, one point expressed as the ray's coordinate along the X axis and angle with respect to the Z axis, and the other point similarly expressed on the Y axis.

FIG. 16 are the simultaneous equations for a straight line ray propagation in phase space between points ($X_1$, $X_1'$) and ($X_2$, $X_2''$).

FIG. 17 is a transport matrix form of expressing the equations of FIG. 16.

FIG. 18 is a diagram of a ray propagating through a drift space.

FIG. 19 is the simultaneous and transport matrix form of expression of the propagation of a single ray in phase space.

FIG. 20 is a diagram of ray propagation through a thin lens.

FIG. 21 is the simultaneous equation and matrix expression for thin lens propagation in phase space.

FIG. 22 is a diagram of a single ray propagating across an interface between two mediums having different refractive indices.

FIG. 23 is the simultaneous equation and transport matrix form of expression defining ray propagation across an index change.

FIG. 24 is an illustration of the propagation of a ray through two drift spaces on either side of a thin lens.

FIG. 25 is a system of simultaneous equations which define the propagation of FIG. 24.

FIG. 26 is the transport matrix form of defining the propagation of FIG. 24.

FIG. 27 illustrates the rules of matrix multiplication.

FIG. 28 illustrates the rules of calculating the determinant of a matrix.

FIG. 29 is a diagram illustrating the problem of focusing an image.

FIG. 30 is the transport matrix for the system of FIG. 29.

FIG. 31 is the solution for the value of $X_4$ from the matrix of FIG. 30.

FIG. 32 illustrates the relationships that are used to find the proper value for the drift space length L2 which causes a focus at $A$.

FIG. 33 illustrates the magnification of the system of FIG. 29.

FIG. 34 illustrates propagation of a single ray through a single, curved air-glass interface.

FIGS. 35(A) through 35(E) illustrate the simultaneous equation and matrix form of expressing the propagation shown in FIG. 34.

FIG. 36 illustrates propagation through a thick lens.

FIG. 37 is the matrix multiplication expression for the transport matrices for the elements in the order in which the light encounters them.

FIG. 38 is the transport matrix which results from the simplification of the expression of FIG. 37.

FIG. 39 is the transport matrix of FIG. 38 simplified for the in-air case.

FIG. 40 is the transport matrix of FIG. 38 simplified for the thin lens case where L=0.

FIG. 41 is the transport matrix of FIG. 39 simplified for a plano-convex lens.

FIG. 42 is a diagram of propagation of a light ray through a graded index lens.

FIG. 43 is the expression for the index of refraction of a graded index lens.

FIG. 44 is a graded index lens transport matrix.

FIGS. 45(a) and 45(b) are the expressions for the pitch of a graded index lens.

FIG. 46 is the transport matrix of FIG. 44 with the expressions of FIG. 45 substituted therein.

FIG. 47 is the matrix expression used to adjust any of the transport matrix expressions given herein which assume light arriving and departing in air for the case where the arriving and departing light propagate in mediums other than air.

FIG. 48 is an illustration of the situation assumed in the transport matrix expression of FIG. 47.

FIG. 49 is an illustration of a beam of light propagating in air.

FIGS. 50(A)-50(C) are illustrations of the phase space diagrams of the beam of FIG. 49 as it propagates along the Z axis.

FIGS. 51(a) through 51(d) are a collection of simultaneous equations useful for transporting a phase space plot in the form of an ellipse from one point in space to another using a single transport matrix to define the entire optical system through which the beam passes.

FIG. 52 is the tranport matrix for a thin lens.

FIG. 53 is a phase space plot showing the emittance phase space of a typical light emitting diode and the two components of the acceptance phase space of a fiber optic light guide bent as in the couplers of the preferred embodiment.

FIG. 54 is a plot of the actual acceptance phase space components of a multimode fiber optic light guide bent according to the teachings of the invention.

FIG. 55 is a symbolic diagram showing the method and apparatus for manufacturing a cylinder correction lens.

FIG. 56 is a plan view of an optical coupler according to the preferred embodiment of the invention.

FIG. 57 is a perspective view of the front of an optical coupler according to the preferred embodiment of the invention.

FIG. 58 is a side view of the preferred embodiment of an optical write coupler according to the teachings of the invention.

FIG. 59 is a rear plan view of the preferred embodiment of a write coupler according to the teachings of the invention.

FIG. 60 is a side view of the preferred embodiment of a read coupler using a pigtail fiber optic light guide to accept the emitted light and guide it to a light detector elsewhere.

FIG. 61 is a side view of the preferred embodiment of an optical read coupler using a light detector directly optically coupled to the graded index lens.

FIG. 62 is a diagram of an apparatus for measuring phase space of a light beam.

FIG. 63 is a diagram of a typical telephone subscriber loop environment using the couplers according to the teachings of the invention.

FIG. 64 is a typical emittance phase space intensity contour plot for the X axis.

FIG. 65 is a typical emittance phase space intensity contour plot for the Y axis.

FIG. 66 is a typical acceptance phase space intensity contour plot for the X axis.

FIG. 67 is a typical acceptance phase space intensity contour plot for the Y axis.

FIG. 68 illustrates the different optical components that may be used to adjust the shape and orientation of the phase space.

FIGS. 69-74 illustrate further features of the invention.

FIG. 1 illustrates a prior art coupler whereby light is coupled between an electro-optic transducer 68 and an optical fiber 1 at a fiber bend 22. The fiber is held in a groove 17 formed in a fiber guide 14. The groove 17 includes the bend 22 having a radius and sector angle which is experimentally determined for best coupling efficiency.

Substrate 16 includes first and second flanges 18 which define first and second grooves or rails along which a clamping member 20 can slide parallel to the X-Y plane. An end face 25 of the clamping member 20 has a curved projection 26 having a curvature which is complementary, to the curvature of the groove 17 so as to clamp the optical fiber in the groove 17 with the desired bend when the clamping member 20 is pressed against the fiber guide 14. This clamping is done utilizing a force which urges the clamping member 20 along the direction of arrow 28. Preferably, the force is applied by resilient means such as spring (not shown) so as to maintain a continuous load on the fiber regardless of dynamic changes which may occur over time, such as temperature induced differential material expansions and contractions, material creep due to stress, etc. The fiber bend has a radius of curvature sufficiently small so as to cause light to leak or radiate therefrom. The radius of curvature of the bend and the number of degrees subtended by the bend is a matter for experimental determination. A radius of 0.152 inches and an angle of 30 degrees has been found to work well for write couplers and read couplers with multimode fiber, a radius of 0.204 inches and a sector angle of 21° being preferred for use with single mode fiber. The particular radius and sector angle chosen are largely governed by an amount of insertion loss desired for the coupler. The fiber optic lightguide itself is comprised of a core having a refractive index usually between 1.46 and 1.53 surrounded by a cladding having an index of refraction lower than that of the core, e.g., 1.485. The cladding is surrounded by a buffer layer having an index of refraction higher than that of the cladding, e.g., 1.5.

According to the invention, phase space matching optics is utilized to improve the coupling efficiency between the optical fiber and the transducer. This can be done by curving the mirror 4 appropriately to alter the phase space of light emitted from a light emitting diode in the position of light element 68 to match the acceptance phase space at a reference plane of the fiber in the groove 17. The same technique can be used to alter the phase space of light emitted from the fiber to substantially match the acceptance phase space of a light detector or a second fiber optic light guide located at the position of the light element 68. This can be done by curving the mirror 4 in three dimensions so as to optimize focusing between the fiber core and the light element. A parabolic or an elliptical mirror are two alternative embodiments.

Referring to FIG. 3, there is shown a symbolic diagram for an embodiment for an optical system for an optical coupler where a single curved mirror performs all the phase space transformations necessary to improve coupler coupling efficiency. The mirror 4 of FIG. 3 has a carefully designed shape which takes light from one point, i.e., the light element 68 and focuses it to two lines or "pseudofocii" intersecting the Y axis at D and F. This mirror has a shape designed for a write coupler where light is injected into the fiber. A read coupler mirror may be substantially identical depending upon the phase space of the light detector or waveguide being used to receive the light emitted from the coupler. For drift spaces L1, L2, L6 and L7 as given in FIG. 3 in thousandths of an inch, and for a beam width along the Y axis at reference plane 100 of 0.01 inches and a beam width along the Z axis at the same reference plane 100 of 0.01 inches, the curvature of the mirror in the coordinate system shown in FIG. 3 with the origin at the center of the mirror is given by the coefficients given in the table of FIG. 4. The coefficients in column B on lines 27 through 33 and lines 38 through 43 define a function in space $F(x,y,z)=0$ that defines the shape of the mirror. The coordinate system, for this function is as shown in FIGS. 3 and 9–11 and 13. The coefficients of FIG. 4 define the following equation defining the surface of the mirror: $-9.7X^2-12.95y^2+y-0.00001z^2-z+130x^2y-1340x^2y^2-3x^2z+77y^3-700y^4-810x^4=0$. To make this mirror, a mold can be manufactured using a numerically controlled milling machine to cut the surface of the mold to become the reflecting surface of the mirror. This can most easily be done by dividing the surface into zones which are small enough to have substantially only one contour level in the zone and mapping the contour in each zone into suitable numerical controlled machine commands to cut the surface of the mold in the corresponding zone to a corresponding contour level.

Referring to FIG. 5, there is shown a symbolic diagram of an optical system for a write coupler which has been optimized using phase space techniques for improved efficiency of injection of light into the fiber. Electrical signals bearing the information to be injected into the fiber 102 are used to drive a light emitting diode 104.

A graded index lens 106 is attached to the front light emitting surface of the light emitting diode 104 and is optically coupled to the light emitting diode so as to capture as much emitted light as possible. The graded index lens 106 used in the preferred embodiment is a 3 mm diameter, 0.5 numerical aperture graded index lens with a pitch of 0.29. The end surface 110 of the graded index lens is separated from a cyclinder correction lens 118 by a drift space of air of 0.02 inches dimension.

The cylinder correction lens 118 is a lens which is curved and has focal power in one axis but is straight and has no focal power in another orthogonal axis. This cyclinder correction lens thus changes the angles of light rays lying in one orthogonal plane while not affecting the angles of light rays lying in another orthogonal plane.

The cylinder correction lens is separated from a mirror 119 by an acrylic filled drift space. The centerpoint of the mirror is located 0.075 inches from the end surface 110 of the graded index lens. The centerpoint of the mirror is separated from the fiber by an acrylic filled drift space 0.99 inches in length.

In this embodiment, the fiber 102 is a multimode fiber 85–125 microns in diameter with a bend radius of 0.152 inches and a sector angle of 30 degrees. In single mode fiber embodiments, the bend radius can be from 3.8 millimeters to 7.2 millimeters with a sector angle of 21 degrees, and the graded index lens preferably will have a pitch of 0.38.

The purpose of the graded index lens 106 is to alter the phase space of the light emitted from the light emitting diode 104 so as to match the emittance phase space for light emitted from the LED to the acceptance phase space characteristics of the fiber 102 for light in the straight projection plane as it exists at the reference plane 108. The reference plane 108 can be any arbitrary plane, and in the FIG. 5 embodiment corresponds to the back surface of the coupler.

The concept of phase space and various other issues concerning phase space will now be explained. A plot of the phase space of a beam at any particular reference plane in space is essentially a plot of the angle of each ray to a reference axis and the coordinate of that ray at the reference plane on a second, orthogonal reference axis. The locus of all such points is the phase space plot for the beam at the reference plane. This can be visualized by reference to FIG. 6. There a single ray from a beam of light is shown passing through an area of space having the illustrated coordinate system. At position Z1 on the Z axis the ray is described by its positions X1 and Y1 and by its slopes X1' (measured as the change in X position for a unit of displacement along the z axis) and Y1' (measured similarly). Standing at Z1 looking down the Z axis toward the point Z2, positive X is to the right and positive Y is up. At Z2, X1'=X2' and Y1'=Y2' which means that the ray travels in a straight line.

Now if one considers the beam of light at any value Z1 along the Z axis, the beam there can be considered to comprise a large number of individual rays, each defined by a position X1 and an angle or slope X1'. The locus of all such points is called the X axis phase space plot and is shown in FIG. 7. The locus of all such points comprised of the coordinate pairs Y1 and Y1' is shown as the phase space plot of FIG. 8. Obviously any optical element like a lens that changes the angle of individual rays can alter the shape of the phase space plots. A "drift space" as that term is used herein means a section of free space through which a ray passes without having its angle altered by encountering any optical element which has a different refractive index from the refractive index in which the ray is traveling. In FIGS. 7 and 8, the preferred units of measure are millimeters and radians. Radians are preferred because later herein transport matrices will be discussed as a mathematical mechanism for evaluating the effect of various optical elements in phase space diagrams, and angles must be expressed in radians to use transport matrices.

In a phase space plot, every ray is plotted as a point. After every ray in a beam of light has been accounted for, the locus of all points can be encompassed by a simple figure such as a circle, ellipse or parallelepiped. Different shapes can often be used to encompass the same locus of points, but the ellipse is realistic and the most frequently used. In actuality, every phase space plot such as those shown in FIGS. 7–9 includes a third dimension in addition to the two dimensions shown in the plane of the plot. The third dimension represents a relative intensity of phase space plot. In practice, the "edge" or boundary of the phase space plot is arbitrarily defined as the locus of all points whereat the relative intensity is a predetermined fraction of a maximum intensity within the plot, e.g. 1%, 2%, 5% or 10% typically. For practical devices such as lasers, LEDs, or bent fibers, the phase space plots therefore have a maximum intensity approximately located in the geometric center of the plot, with the intensity gradually decreasing away from the plot center until the intensity reaches the arbitrarily chosen predetermined minimum value. It can be appreciated several different predetermined minimum values can be chosen, e.g. 10%, 20%, 30% . . .

100% so as to create a phase space contour plot, as illustrated in FIGS. 64-67.

A law of physics states that the area of a phase space plot, as defined by some arbitrary but fixed minimum intensity fraction which thus defines the plot boundary, remains constant as a beam traverses any number of optical devices. The area is measured by a unit of measure equal to one unit of distance time one unit of angle. Typical phase space area measures for common optical devices are given below in Table I.

TABLE I

| Object | Full widths at Half max | | Phase Space area Micron |
|---|---|---|---|
| | Microns | Radians | Radians |
| Flashlight | 50,000 | 0.1 | 5,000 |
| He Ne laser | 1,300 | 0.0015 | 2 |
| LED (ball lens) | 600 | 0.15 | 90 |
| SS Laser | 5 | 0.5 | 3 |
| 100 micron multimode fiber end | 100 | 4 | 40 |
| Coupler, 100 micron bent fiber core | 100 | 0.1 | 10 |
| Fraunhoffer Patch | D | $\frac{0.881}{D}$ | 1 |

Any object in Table I which has a phase space area larger than a second object can, in principle, trap 100% of the light from that second object. However, no technology can cause a beam of larger emittance phase space area to be injected or 100% captured by a target having a smaller acceptance phase space area. Thus, it would be possible to capture substantially all the emitted light of either laser in Table I in the 100 m core of the fiber bent by the coupler, but no optical system could cause all the emitted light from the LED to be captured in the coupler fiber core.

There are three exceptions to the principle of conservation of phase space area. They are: (1) passing a beam of light through a scattering screen irreversibly enlarges the phase space area; (2) passing a beam of light from one refractive index N1 to a second refractive index N2 changes the phase space area by the factor $\times N1/N2$—this reverses when the beam returns to the first index because the phase space area is multiplied by the factor N2/N1; (3) passing a light beam through a nonlinear optical element deforms the phase space plot in such a way that the phase space area is effectively increased. The beam can then be untwisted by a negative nonlinear element as is illustrated in FIG. 9. The first nonlinear element 123 distorts the beam thereby increasing its phase space area from that shown at 125 to that shown at 127. The graded index lens 129 and the negative nonlinear element 131 reverses the effect.

The fundamental idea of the invention for use in improved optical coupler designs is to match the acceptance phase space area and shape of a read or write coupler as closely as possible to the emittance or acceptance phase space configuration and area which each being definable by reference to a common reference phase and common predetermined minimum relative intensity values.

Because the ellipse is a commonly encountered phase space plot, it is useful to mathematical terminology to described the ellipse. This terminology takes the form of the parametric equations of an ellipse. Referring to FIGS. 10 and 11, there are shown two diagrams useful in defining the parametric equations of the ellipse. In FIG. 10, X and X' are half spatial and angular widths, respectively. The two intercepts on the X and X' axes, Wx and Wx' are called the "waists" of the beam. The same parameters are used to characterize the ellipse on the Y axis. FIGS. 12(A) through 12(J) give the parametric equations that define the ellipses of FIGS. 10 and 11. FIGS. 13(A) through 13(D) show a few examples of different ellipses along their defining parameters.

Before discussing the concept of transporting of phase space area, it is necessary to develop the concept of the transport matrix in optical system analysis. This will be called matrix optics. In matrix optics, we follow each ray separately through a given system of lenses, drift spaces and index of refraction interfaces. Referring again to FIG. 6, assume that the Z axis is the centerline of the train of optical elements that make up the optical system under analysis. Each ray in the system is completely specified an any position by its horizontal and vertical distances from the centerline, by its horizontal and vertical slopes relative to that axis and by its wavelength. Matrix optics assumes monochromatic light and paraxial rays wherein X'=tan X'=X', where X'<<1. The position and slope of a ray may be expressed as a 2×1 matrix. One such matrix is shown in FIG. 14 and another such matrix is shown in FIG. 15. The ray changes as it translates along the Z axis from position Z1 to Z2. The pair of simultaneous equations of FIG. 16 express this change, and this pair of simultaneous equations can be expressed in matrix form as shown in FIG. 17.

A diagram of a typical drift space is shown in FIG. 18, and the corresponding pair of simultaneous equations and matrix which express the propagation of the ray through the drift space are shown in FIG. 19. Propagation of a ray through a thin lens is illustrated in FIG. 20. The simultaneous equations and matrix equation which quantify the changes caused by this propagation as shown in FIG. 21. Propagation of a ray through a change in refractive index is illustrated in FIG. 22, and the simultaneous equations and matrix equations which characterize this propagation are shown in FIG. 23.

In FIGS. 20 and 22, the ray is transported from just to the left to just to the right of the optical device such that Z1 is effectively equal to Z2. However, since the ray has undergone change at the interface, we maintain the lables 1 and 2.

A more complicated optical system is shown in FIG. 24. There a ray propagates through a first drift space L1, a thin lens with a focal length F and a second drift space L2. Algebraically, this propagation can be characterized by the 6 simultaneous equations of FIG. 25. The same problem can be solved using the rules of matrix multiplication as shown in FIGS. 26 and 27.

A useful check on the accuracy of multiplication is that the determinant of a valid matrix equals N1/N2 where N1 and N2 are the refractive indices of the mediums from which the ray originated and finished, respectively. Since most rays start and finish in the same medium the vast majority of the time, the determinant of a valid transport matrix is usually unity. A simple method of calculating the determinant of a 2×2 matrix is illustrated in FIG. 28. The matrix of FIG. 28(B) could be an optical train of elements that starts in diamond with a refractive index of 2 and ends in air with a refractive index of 1. The matrix of FIG. 28(C) represents an optical system where the ray starts and stops in the same medium.

The problem of focusing an object into an image is illustrated in FIG. 29. Every ray from the point X1 located near Z1 must converge onto a single point X4 located near Z4. The transport matrix for the system of FIG. 29 is shown in FIG. 30. The expression of FIG. 31 can be derived from the matrix of FIG. 30. By finding a value for L2 which results in a zero coefficient for X1', every ray from point X1 (with any slope X1') focuses on the corresponding point X4 thereby forming an image at Z4 of the object at Z1. To find the proper value for L2, the relationships of FIG. 32 are used. The magnification is given by the expressions of FIG. 33.

FIG. 34 illustrates the problem of focusing action at a single air-to-glass interface. The propagation of FIG. 34 is characterized by the equations of FIGS. 35(A) through 35(E). The convention used in FIG. 34 is that the radius of curvature R to the right of the interface has a positive sign and light passes from index N1 to index N2. Also, it is assumed that N1 and N2 are independent of wavelength.

FIG. 36 defines the problem of propagation of a light ray through a thick lens. Most lenses in fiber optic applications must be viewed as thick lens. FIG. 37 is the matrix multiplication expression for the transfer matrices in the order in which the light encounters them. This can be simplified to the matrix expression of FIG. 38. For the usual in-air case, the expression of FIG. 38 can be simplified to that of FIG. 39 by setting N1=1 and N2−N1 equal to D N. For the special case of L=0, i.e., a thin lens, the expression of FIG. 40 results from the exression of FIG. 39.

FIG. 41 illustrates the simplification of the matrix of FIG. 39 for a plano-convex lens where R1 is infinite with light striking the planar surface. R2 is negative in this case.

Graded index lens are very useful in fiber optic applications. Accordingly, a graded index lenses transport matrix is a useful thing to develop. FIG. 42 is an illustration of a model of graded index lens light propagation for use in developing such a transport matrix. The index of refraction of a graded index lens is given by the expression of FIG. 43. FIG. 44 is the graded index lens transport matrix. The pitch of a graded index lens is given by the expressions of FIGS. 45(a) and 45(b). Substituting the relationships of FIGS. 45(a) and 45(b) into the transport matrix of FIG. 44 gives the alternative transport matrix for a graded index lens of FIG. 46. Typical values for half pitch graded index lens are:
P=0.5
n=1.602, and
a=0.2995 per millimeter.
The determinants of the matrices of FIGS. 44 and 46 are unity.

The transport matrices presented herein apply to the paraxial case defined above where the angle is small and the angle sine and tangent geometric functions substantially equal the angle itself expressed in radians. Also, the ray approximation of geometric optics is assumed. The phase space methodology of the present invention is usable in applications, especially couplers, which utilize either multimode or monomode fiber.

In using transport matrices to analyze optical systems, the index of refraction of the medium through which the rays are arriving must be taken into account. This is especially true herein since most lab measurements are taken in air, and in most of the applications described herein, the injection medium has an index or refraction different from that of air. This is especially true with regard to the graded index lens transport matrices of FIGS. 44 and 45 which transport a ray from just to the left of the graded index lens in air to just of the right of the graded index lens in air. If the arriving light is coming in through a medium having an index of refraction of $n_1$ and departs through a medium having an index of refraction $n_2$, then a pair of interface matrices must be placed in front of and behind the graded index lens transport matrix or any other transport matrix assuming air as the arrival and departure medium. The form of this expression taking into account arrival and departure matrices different from air is as shown in FIG. 47. The expression of FIG. 47 is modeled upon the hypothetical situation shown in FIG. 48 where the light leaves an acrylic plastic, passes through a very thin slab of air, enters the graded index lens, exits through a very thin slab of air and then re-enters whatever medium has index $n_2$. Of course, a transport matrix for a graded index lens to transport from acrylic to acrylic could be developed, but this would not do for a glass to glass situation, so the expression of FIG. 47 is the most useful way to handle this situation.

Phase space area describes and entire beam of light. As the beam of light moves along the Z axis, the beam shape changes, but always in a manner so as to conserve phase space area. This is illustrated in FIG. 49. This figure illustrates a beam which is freely drifting and which drifts into and out of focus. The phase space area plots at various positions along the Z axis are shown in FIG. 50. Note that the area is conserved, but the shape and orientation, i.e., of the long axes of the ellipses, of the phase space plot changes as the beam drifts.

FIG. 49 illustrates the general concept of transporting a phase space pattern through optical elements such as lenses, drift spaces, graded index lenses and index interfaces. The teachings herein of how to use transport matrices to transport single rays of light can be extended to transporting entire beams of light. Each ray is transported in the same way, but the ellipse which forms the boundary of the area of points representing the individual rays changes shape and orientation in a way which can be calculated using transport matrices. The equations used to do this are given in FIGS. 51(a) through 51(d). The (a,b,c,d) transport matrix given in the text above FIGS. 51(a) through (d) for a thin lens is given in FIG. 52.

For maximum efficiency of light injection from the light emitting diode 104 into the fiber optic light guide 102 (FIG. 5), it is necessary to arrange the optical system between the light emitting diode and the optical fiber such that there is a substantial match between the plot of the phase space of a light beam all of whose rays will be accepted into a guided mode in the fiber 102 and the phase space plot at the same reference plane for the light emitted from the light emitting diode 104.

The optical system is essentially comprised of the lenses and drift spaces between the light emitting diode and the fiber 102.

To understand the concept of phase space matching (FIG. 5), reference to FIG. 53 will be helpful. FIG. 53 shows the acceptance phase space 112 and 114 of the fiber 102 at the reference plane 108 and shows the emitted light phase space 116 of the LED 104 at the output window. The acceptance phase space of the fiber defines the characteristics of all the light rays which have positions in space and angles of travel through space relative to the fiber which are such that the rays will be accepted into one or more guided modes in the fiber core. Light rays outside the acceptance phase space have positions and angles of travel through space such that they will not be accepted into a guided mode either because they will miss the fiber or exceed the critical angle at the core/cladding interface and escape from the fiber as opposed to being totally internally reflected back into the core.

Note that the acceptance phase space of the fiber 102 has two components: a straight projection plane component 112 defining the rays in the straight projection plane which will be accepted into one or more guided modes (hereafter to be called the X-Z plane component); and a curved projection plane component 114 defining the rays in the curved projection plane (hereafter to be called the YZ plane) which will be accepted into one or more guided modes. The X-Z plane component 112 has a straight "spine" or central axis, while the Y-Z plane component 114 has a curved spine.

The phase space 116 of the emitted light of the LED has straight spine as it exists at the LED, in both the X-Z and Y-Z plane components and thus these components need to be "mapped" by use of lenses, drift space, etc. so as to correspond as close as possible to acceptance phase space componets 112, 114.

Each of the phase space ellipses can be mathematically defined in terms of the parametric equations given in FIGS. 12(A) through 12(J). The behavior of light rays after "transport" of the rays through various optical elements such as lens, drift spaces and interfaces between mediums having different indices of refraction can be predicted using transport matrices as can entire phase space plots. For example, the change in shape and orientation in terms of the key parameters of FIGS. 10 and 11 of the phase space plots of FIG. 53 as the output beam from the LED passes through the various optical elements of the system of FIG. 5 can be predicted using the simultaneous equations of FIGS. 51($a$) through 51($d$) and a single transport matrix that defines the effects of the optical elements of the system shown in FIG. 5. The transport matrices for the basic elements of most optical systems are given in the drawings herein.

The transport matrix from air to air of a thick lens is given in FIG. 38. In fiber optic applications, most lens must be viewed as thick. The transport matrix from air to air of a graded index lens is given in FIGS. 44 and 46. A graded index lens is a short length of graded index optical fiber in most cases with a lower index of refraction at the outer periphery and a higher index of refraction at the center.

Phase space area plots can be transported using the equations and transport matrices given in the figures herein. An example of a phase space area drifting through free space is given in FIGS. 49 and 50. Since the optical system shown in FIG. 5 can be defined in terms of a single transport matrix using the techniques described herein, the effect of this optical system on the phase space of the light emerging from the LED, i.e., the emittance phase space, can be predicted for any given set of parameters of the graded index lens and cylinder correction lens as well as all drift spaces and index interfaces if any.

The parameters chosen for the graded index lens and cylinder correction lens and the drift spaces between all these components depends upon the shape, size and orientation characteristics of the acceptance phase space for the fiber. Selection of the optical characteristics for the system depends, for example, upon the type of fiber, the sector angle and the amount of bend of the fiber which has been chosen and further depends upon the characteristics of the emitted light phase space of the LED. The general principal is to select the optical characteristics of the coupling or coupler system so as to alter the emittance phase space size, shape and orientation to substantially match the size, shape and orientation of the acceptance phase space of the fiber in the case of a write coupler. In the case of the read coupler, the guiding principle is to select the optical system characteristics so as to alter the emittance phase space of the beam from the bent fiber to substantially match the size, shape and orientation of the acceptance phase space of the light detector or the optical waveguide leading from the coupler to the light detector.

The size, shape and orientation of the acceptance and emittance phase space plots can be measured with the key parameters given in FIGS. 10 and 11. The goal is to obtain 100% coincidence of all key parameters between the acceptance phase space and the emittance phase space, but in practice this is presently very difficult. Failing 100% coincidence, the alternative goal is to obtain as close a match as possible. Optimally, the bend profile of the fiber 102 in the coupler and the electro-optic device to be coupled therewith, e.g. light emitter or light receiver, are chosen such that the emittance phase space plot area is less that the acceptance phase space plot area so that tolerances for the lens system mapping are reduced. In some situations this may be difficult to achieve. Specifically, for a write coupler which bends a signal mode fiber, the acceptance phase space area for the bent fiber turns out to be very small, much smaller than that specified for the multimode fiber bend in Table I. In this case, if an LED is used, even with optimum lensing, very low coupling efficiency is obtained since the LED's emittance phase space is so much greater than the acceptance phase space of the bent single mode fiber. Nevertheless, substantial coupling improvement according to the invention is achievable if appropriate lenses, drift space, etc. is utilized so as to insure that the acceptance phase space plot lies within and on a maximum intensity area of the emittance phase space plot. Optimum coupling efficiency is achievable with a single strip laser since it has a much smaller emittance phase space plot, especially if it is modified as taught herein to coincide to the extent practicable with the bent fiber acceptance phase space plot.

Since the acceptance phase space and emittance phase space characteristics change from one embodiment to another, the parameters of the optical system must be adjusted to account for the changed phase space areas for the fiber and the LED from one embodiment of the invention to another. Accordingly, the particular parameters of the optical system given in FIG. 5 are typical of only one embodiment according to the teachings of the invention and are not the only parameters which implement the teachings of the invention. For example, when the radius of the fiber bend, the type of fiber or the sector angle of the fiber bend is changed, the acceptance phase space of the fiber changes its characteristics. This would require a different optical system to match the emitted light phase space of the light emitter to the acceptance phase space of the fiber. The differences in the optical system would generally amount to changes in pitch, gradient and/or length of the graded index lens, substitute lenses, different drift spaces and/or different curvature for the cylinder correction lens focusing surface. Accordingly, the particular parameters chosen for the optical system must be experimentally determined by trial and error and/or computer simulation until the best phase space match is found for a particular selection of light emitter and fiber bend configuration. The better the match between the phase space area of the emitted light phase space of the light emitter and the acceptance phase space of the fiber, the more efficient is the coupling of the coupler.

In a preferred embodiment of a write coupler optical system as shown in FIG. 5, the fiber 102 is 85/125 micron diameter multimode fiber (Coreguide 1519 available from Corning Glass Works) with a bend radius of 0.152 inches with a sector angle of 30 degrees. The cylinder correction lens 118 has a focal length of 9.4 millimeters, and the pitch of the graded index lens is 0.29 with a 0.5 numerical aperture and a diameter of 3 millimeters.

The function of the graded index lens in a preferred embodiment of the optical system of FIG. 5 is to alter the emittance phase space area 116 of the LED to substantially match the size, shape and orientation of the acceptance phase space area 112 for light in the X-Z plane or at least match these two phase space areas as closely as possible. In alternative embodiments, the graded index lens may be configured so that the emittance phase space area 116 is altered to substantially match the size, shape and orientation of the curved spine acceptance phase space area 114 for light in the Y-Z plane. However, this is not preferred since the curved spine of the phase space area 114 will cause a greater mismatch between phase space areas unless special focusing is done. This special focusing cannot be easily implemented using a graded index lens.

The purpose of the cylinder correction lens 118 and the drift spaces shown in FIG. 5 is to alter the phase space area of the light emerging from the graded index lens in the Y-Z plane to match the acceptance phase space 114 for light in the Y-Z plane without altering the phase space area of light emerging from the graded index lens in the X-Z plane. To do this, the cylinder correction lens is formed to focus light in the Y-Z plane but not focus light in the X-Z plane and to have a curvature which changes at different places on the surface of the cylindrical lens so as to substantially match the size, shape and orientation of the acceptance phase space 114. Since the curvature of the spine of the Y-Z plane phase space area is so slight, in some embodiments the curvature of the spine of the acceptance phase space area will be ignored and the cylinder correction lens will have the same radius of curvature throughout its surface for focusing light in the Y-Z plane without any focusing for light in the X-Z plane.

In the more efficient preferred embodiments, the curvature of the spine of the Y-Z plane acceptance phase space will be taken into account. In these embodiments, the curvature of the focusing surface for light in the Y-Z plane changes over the surface of the lens 118 to cause alteration of the shape of the Y-Z plane emittance phase space area to add curvature to the spine thereof to substantially match the size, shape and orientation of the Y-Z plane acceptance phase space. The exact curvature of the surface of the lens must be determined experimentally after measuring the curvature of the acceptance phase space area 114 of the light in the Y-Z plane. The Y-Z plane acceptance phase space area may then be divided up into zones and a proper curvature for the portion of the cylinder correction lens 118 focusing light into each zone is selected by computer simulation or experimental determination.

An actual phase space measurement for both the Y-Z plane and X-Z plane acceptance phase space is illustrated in FIG. 54. The points marked by x's are Y-Z plane acceptance phase space measurements while the points marked by triangles are X-Z plane acceptance phase space measurements. Of course, the Y-Z plane acceptance phase space shown in FIGS. 53 and 54 is as measured at the reference plane 108. However, the emittance phase space area 116 translates to the phase space area shown in dashed lines in FIG. 53 while transporting through the drift space between the reference plane 108 and another reference plane 120 at the surface of the cylinder correction lens 118 closest to the fiber 102.

The cylinder correction lens 118 serves to substantially match the emittance phase space of the Y-Z plane output light from the graded index lens 110 to the Y-Z plane acceptance phase space shown at 114 in FIG. 53.

The manner in which the cylinder correction lens may be made is illustrated in FIG. 55. A disk 126 of acrylic or other machinable, transparent plastic having an index of refraction closely matching the index of refraction of the buffer or jacket of the fiber 102 is mounted on a lathe 127. A cutting head 128 controlled by a numerically controlled lathe cutter control system 130 cuts the edge 132 of the disk to have a profile defined by a numerical control edge profile program 134. The contents of the edge profile program must be experimentally determined from the zone focus method described above or any other suitable method which will cause the Y-Z plane emittance phase space to be altered in size, shape and orientation to substantially match the Y-Z plane acceptance phase space. After the desired edge profile is formed, a thin slice of the plastic of the disk can be cut off as shown at 136 such that the profiled edge forms one surface of the lens and the flat cut surface forms the other surface of the lens. The cut edges may then be polished to optical grade smoothness, and the segment cut from the disk may then be used as the cylinder correction lens 118. Note that the curvature of the lens surface is along one axis only to provide the desired astigmatic correction.

Referring to FIG. 56 there are shown a plan view of another preferred embodiment of the write coupler. The view shown in FIG. 56 is looking down the X axis in the negative direction at the top of the coupler. Note that the reference coordinate system in FIG. 56 is different than the coordinate system shown FIG. 1.

FIG. 57 shows the coupler in perspective view with the details on the back side of the coupler hidden. The structures on the front side of the coupler will be described with joint reference to FIGS. 56 and 57 and apply equally to read couplers except that the direction of light travel in the fiber is reversed for read couplers.

The fiber optic waveguide 140 is pressed into a groove in a clear acrylic fiber guide 142 formed into two segments 144 and 146. These two segments are preferably integrally molded portions of a clear acrylic substrate 148 which is molded to have a flat top surface 150 and a flat back surface or backplane 152 which serves as the reference plane 108 in FIG. 5. The fiber guide segments 144 and 146 are preferably molded so as to extend away from the top surface 150 of the substrate in the positive X direction. Optical components in FIGS. 5 and FIGS. 56 through 60 which are identical will be identified by the same reference numerals.

The fiber optic waveguide 140 is pressed into the groove in the fiber guide 142 by a plastic clamping plate 154 which slides back and forth on a pair of plastic rails 156 and 158 which can be integrally molded into the plastic of the substrate so as to extend upward in the positive X direction away from the top surface 150. Engagement between the clamping plate 154 and the rails 156 and 158 is by tongue-in-groove or other suitable arrangement. A cam operated clamping mechanism (not shown) driven by a shaft (not shown) coupled to a screw head 160 serves to move the clamping plate 154 toward and away from the fiber guide 142.

The end of the fiber guide 144 has formed thereon a mirror 119 having a reflective surface which faces the fiber and which causes light rays focused by the optical system to be described below to be directed toward the fiber 140 at a bend 162 in the groove of the fiber guide. Light focused by the optical system is directed by the mirror 119 into guided modes in the fiber 140 and is thereby "launched". This launched light emerges from the coupler at the left in FIG. 56. In the case of a read coupler, light enters the fiber from the left and is guided by the fiber 140 to the bend 162 in the groove where the fiber is also bent by the clamping action of the clamping plate 154. At the bend, the critical angle for total internal reflection is exceeded, and some of the light escapes from the fiber. The escaping light travels through the clear acrylic of the fiber guide 144 and meets the reflective surface of the mirror 119. There, the escaping light is reflected in the direction of the negative X axis so as to pass through the substrate and emerge from the back surface 152. It should be understood that the term "escaping light" as it is used herein should be understood as including light which is traveling toward the fiber from the LED for purposes of launching it into guided modes in the fiber for propagation therein.

Referring to FIG. 58, there is shown a top view of this preferred embodiment of the write coupler looking in the direction of the arrow 164 in FIG. 56. From this angle, the structures on the back of the coupler can be better seen. The path of the light which is launched into the fiber is shown at 170/168. Light is emitted from the LED 104 and is captured within the numerical aperture of the graded index lens 106. Light emerges from the LED at many angles as symbolized by the numerous arrows symbolizing various light rays. The graded index lens is a cylindrical lens with a gradient index of refraction along it radius. Because of the graded index of refraction of the graded index lens, many of the light rays which enter the graded index lens 106 at angles at which they might otherwise escape are bent back toward the centerline or optical axis of the lens. The path of one such ray is illustrated at 170. The pitch of the graded index lens and the drift spaces associated therewith are selected so that the phase space of the emitted light from the LED shown at 116 in FIG. 53 is matched to the acceptance phase space of the fiber for light in the X-Z plane as shown at 112 in FIG. 53.

The light rays guided by the graded index lens 106 emerge into an air filled drift space 172 and enter the cylinder correction lens 118. This lens is held in a recess 173 formed in the backplane 152. The cylinder correction lens 118 has curvature such that light rays in the Y-Z plane as they emerge from the graded index lens are further focused while light rays in the X-Z plane as they emerge from the graded index lens are not further focused. This alters the phase space of the light emerging from the graded index lens to match the acceptance phase space of the fiber for light in the Y-Z plane, shown at 114 in FIG. 53, while leaving the phase space for light in the X-Z plane as established by the graded index lens to match the X-Z plane acceptance phase space of the fiber shown at 112 in FIG. 53. The light then emerges from the cylinder correction lens 118 and strikes the mirror 119 where is reflected through the fiber guide segment 144 into the fiber optic light guide 140.

To insure maximum coupling efficiency into the fiber, the graded index lens 106 and the LED 104 are mounted in a stepped bore 180 of a cylindrical holder 182. The fit is such that the LED and graded index lens may be slid toward or away from the cylindrical correction lens. In alternative embodiments, a telescoping structure for holding the graded index lens and the LED may be used. This arrangement is used to tune the coupler for maximum coupling by applying power to the LED and coupling the fiber optic lightguide 140 to a detector for detecting the light intensity of light emerging from fiber 140. The LED and graded index lens are then slid in their respective bores until the intensity of light emerging from the fiber is maximized.

The cylindrical holder 182 is attached to the backplane surface 152 by two flanges 184 and 186 and two screws 188 and 190 and threaded holes (not shown) in the substrate 148. Oversize holes 192 and 194 are formed in the flanges 184 and 186 through which the screws pass with substantial clearance all around the screw. Washers under the screw head engage the top surfaces of the flanges to prevent the screw head from passing through the oversize holes. These oversize holes allow the cylindrical holder 182 to have its centerline position adjusted to align the optical axis of the LED and graded index lens to the optical axis of the mirror 119 and the fiber optic light guide 140 to maximize coupling efficiency. The procedure described above is used to adjust the position of the holder 182 until the light intensity emerging from the fiber 140 is maximized.

In an alternative embodiment, the graded refractive index lens 106 may be replaced by a symmetrical lens 107 which is molded into the back surface 152 of the substrate 148. The purpose of this lens is to perform the same symmetrical alteration of the phase space of the light emitted from the LED which is performed by the graded refractive index lens 106. In this alternative embodiment, the cylinder correction lens 118 may be replaced by an alteration in the shape of the mirror 119. The mirror 119 then performs the same asymmetrical alteration of the phase space of the light emerging from the graded refractive index lens 106 as was performed by the cylinder correction lens 118. Alternatively, the cylinder correction lens may be molded in the material of the cylindrical holder 182 between the location of the LED and the lens 107. Yet another alternative embodiment is to place a cylinder correction lens or other asymmetrical correction lens in the stepped bore between the LED and the molded lens 107. Similar considerations apply to an alternative embodiment of the read coupler of FIG. 61 except that the direction of travel of the light is reversed. The same substitutions may be made however with due consideration to the change in direction of light travel from the fiber to the detector.

Referring to FIG. 59, there is shown a view of the back of the write coupler looking down the Z axis normal to the backplane surface 152 in the negative Z direction. Note that because of the mirror 119, the coordinate system on the back side of the coupler is different than the coordinate system on the front side of the coupler. FIG. 59 shows the alignment of the graded index lens 106 and the LED 104 with the centerpoint of the mirror 19 and how the cylindrical holder 182 may be moved using the oversize holes 192 and 194 in the flanges 184 and 186 to align the centerlines. FIG. 59 also shows the shape of the recess 173 in the backplane surface 152 for the cylinder correction lens 118. This shape is not critical and is used in the prototype only because it is easier to form by machining.

Referring to FIG. 60, there is shown a top view of the preferred embodiment of a read coupler from the same perspective used for FIG. 58. The only differences between the read coupler of FIG. 60 and the write coupler of FIG. 58 are the direction of light travel, the parameters of the optical system and the use of a pigtail optical fiber 191 instead of an LED. Light enters the fiber optic waveguide 140 from the right and escapes the fiber at the bend in the fiber just to the right of the mirror 119 in FIG. 60. The escaping light rays are reflected by the mirror 119 down through the substrate 148 toward the pigtail fiber 191 along the positive Z axis. The pigtail fiber 191 captures some of the light and guides it toward a detector (not shown). The optical system has parameters which are designed to alter the two phase space components of the emitted light from the fiber to the acceptance phase space of the pigtail fiber. As in the case of the write coupler, these parameters must be experimentally determined for the particular pigtail fiber 191 being used, and according to the type of fiber 140 and the bend and sector angle of the bend in the fiber 140.

Referring to FIG. 61, there is shown a top view of a read coupler according to the teachings of the invention using a light detector in the place of the pigtail optical fiber. FIG. 61 is a view from the same perspective as FIG. 60. Again, as in the case of the read coupler of FIG. 60, all structures on the front of the coupler, i.e., the structures shown in FIG. 56, are the same as shown in FIG. 56.

The only difference between the embodiments of FIGS. 60 and 61 is that in the embodiment of FIG. 61 a light detector 193 has been substituted for the pigtail fiber 191. The light detector 193 can be any conventional light detector suitable for the application, i.e., a light detector which has a bandwidth which exceeds the requirements of the application.

As in the case of the write coupler shown in FIGS. 56-59, the light detector 193 and graded index lens 106 are slideably mounted in a stepped bore in the cylindrical holder 182. The graded index lens and the light detector are then slid in the stepped bore at the time of manufacture of the coupler to positions which maximize the coupler coupling efficiency. The acceptance phase space at the reference plane 152 can be measured using the apparatus shown in FIG. 62 and the method described in the discussion of FIG. 62. Once the acceptance phase space of the particular light detector 193 chosen for the application is known, the parameters for the graded index lens 106 and the cylindrical correction lens 118 and the various drift spaces in the system are set to match the emittance phase space components of the bent fiber optic light guide 140 to the acceptance phase space of the light detector 193 to maximize coupling efficiency.

Method of Measuring Phase Space

Referring to FIG. 62, there is shown a mechanism for measuring phase space. A light emitting diode 200 is shown as the light emitting device in this example, but any light emitting device can be used. To measure the phase space, the LED 200 is energized, and a first mask plate 202 having a slit 204 is positioned at the desired reference plane and so that the slit is at a first value of X. The value of X is arbitrary and is a measure of how far up the X axis the slit is compared to compared to the optical axis 206 of the LED. The position of the slit 204 is set using a scanning mechanism 208 of any conventional design which can move the plate 202 to any value of X within reason and hold it there. The projection of the position of the slit 201 on the optical axis 206 is the same for all positions of the slit 204.

After a first value for X is set, a second mask plate 210 having a slot 212 is scanned through a plurality of angles herein referred to as q using a scanning mechanism 214. The angle q for each position of the slot 212 is the angle between the axis 216 of the first slot 204 and a line which connects the first slot 204 to the slot 212. A photodetector located behind the second slot 212 detects the intensity of light at each angle q for a given x position of the first slot 204. After all angles q have been sampled by scanning plate 210 through a plurality of positions for a fixed position of the plate 202, a signal end of slit scan on line 213 is generated by the positioning mechanism for plate 210. This signal is coupled to the positioning mechanism for plate 202. This causes the scanning mechanism 208 to move the plate 202 to a new position of X and held steady while the plate 210 is scanned through a plurality of new positions. A reading of light intensity for each angle q for each postion of the plate 202 is recorded. From this data, the phase space plot may be determined.

Method of Designing an Optical Coupler Couping an Optical Device to a Waveguide

According to one aspect of the invention, a method of designing a coupling device for coupling an optical device to an optical waveguide uses phase space manipulation techniques. In this method, the apparatus and method discussed above in connection with the description of FIG. 62 is used to characterize the emittance phase space of a light emitting device. This characterization can result in a plurality of different intensity contours being found. That is, the phase space plots of FIGS. 53 and 54 represent only two dimensional plots of the phase space at one intensity level. However, phase space is actually a three dimensional concept when intensity is considered. For example, in FIG. 53 if light intensity were plotted on an axis normal to the page, a three dimensional plot looking like a mound coming up out of the page would result. If one were to draw intensity contour lines connecting all the points on the surface having the same intensity, a set of contour lines not unlike the contour lines on a topographical map would result where each contour line represents a series of spots on the surface of the earth all having the same altitude measured relative to sea level or some other reference plane. If those contour lines are projected onto a two dimensional surface, a phase space diagram such as FIG. 64 might result. Assume that FIG. 64 represents the various intensity contours of the emittance phase space at the reference plane for light in the X-Z plane. As the term "light in the X-Z plane" is used herein it is meant that FIG. 64 represents the locus of all points for all rays of light where each point is represented by an angle and a displacement. The angle is the angle to the Z axis of the projection of the ray onto the X-Z plane, and the displacement is the displacement along the X axis of the projection of the ray on the X-Z plane at the point along the Z axis through which the reference plane passes. A similar definition applies for the term "light in the Y-Z plane" with reference to light ray projections on the Y-Z plane.

In FIG. 64, the outer contour marked 10% represents an arbitrarily low level of light intensity selected to define the outer edge of the phase space diagram. Outside this 10% curve, light intensity is everywhere less than 10% of the peak intensity and inside this curve, light intensity is everywhere greater than 10% of peak intensity. Additional intensity curves or profiles can be and have been drawn showing the shape and orientation of the phase space for light rays having intensity from 30% to 90% of peak intensity. The resulting complete contour plot is referred to as the emittance intensity phase space plot. The area inside each contour line does not change when the beam is subjected to optical manipulation such focussing, bending or drifting.

A similar emittance intensity phase space plot can be drawn for light in the Y-Z plane, and such a contour plot is shown in FIG. 65.

A similar operation can be done to characterize the acceptance phase space at various intensity levels. Assume that FIG. 66 represents the acceptance phase space intensity contours at the same reference plane for light in the X-Z plane which will be captured by the target device such as a bent optical fiber waveguide. A similar process is carried out to characterize the size, shape and orientation of the acceptance phase space intensity contours of the light in the Y-Z plane of the acceptance phase space. Assume that FIG. 67 represents these intensity contours.

It will be appreciated by those skilled in the art that optical devices may be used to manipulate the emittance intensity phase space of FIG. 64 such that certain intensity contours for light in the X-Z plane more closely match the shape and orientation of certain acceptance phase space intensity contours for light in the in the X-Z plane. A similar process may be carried out for light in the Y-Z plane. Those skilled in the art will appreciate that, in the hypothetical example given in FIGS. 64 and 66, that not all the light from the light emitting device with the emittance phase space plot of FIG. 64 can be injected into a light accepting device having the acceptance phase space plot of FIG. 66 because the area of the 10% contour plot of FIG. 64 is larger than the area of the corresponding acceptance phase space contour plot of FIG. 66. The best that can be done is to choose the phase space contour plot of FIG. 64 for which the area best matches the area of the 10% intensity contour line in the acceptance phase space plot of FIG. 66. For example, the heavily outlined 70% intensity contour of FIG. 64 has approximately the same area as the 10% contour in FIG. 66. A suitable arrangements of optical components can then be chosen to alter the shape and orientation of the 70% contour of FIG. 64 to match the shape and orientation of the 10% contour in FIG. 66.

The design process according to the teachings of the invention contemplates the process mentioned in the paragraph next above. This is done by characterizing the size, shape and orientation of the phase space contours for the emittance and acceptance phase space components in both orthogonal planes and selecting an intensity contour in each of the orthogonal planes for each of the emittance and acceptance phase space intensity contour plots. The selection of intensity contours is made so that the selected X-Y plane emittance and acceptance intensity contours encompasses approximately the same area. Likewise for the emittance and acceptance phase space intensity contour plots for the Y-Z plane. Then, using the phase space altering devices and techniques described herein, an optical system is designed which alters the shape and orientation of the selected emittance phase space contour in the X-Z plane so as to match as closely as possible the shape and orientation of the selected acceptance phase space component in the X-Z plane. Likewise for the Y-Z plane intensity contours. It will be appreciated that an optical beam is described by its X axis and Y axis variations, i.e., a cross section of the beam is two dimensional and the beam may be quite different in the two dimensions or orthogonal planes. It follows that the design process to devise an optical system to match the size, shape and orientation of an emittance intensity contour and an acceptance intensity contour in the respective phase spaces must take these variations into account. FIGS. 65 and 67 illustrate the differences in the emittance and acceptance phase spaces of the Y-Z plane from the emittance and acceptance phase spaces in the X-Z plane shown in FIGS. 64 and 66, respectively. The design process must devise an optical system which gives as close as possible to a simultaneous, exact match between the selected emittance and acceptance phase space intensity contours in both the orthogonal planes.

This is done typically by selecting one emittance phase space intensity contour in one of the orthogonal planes and altering its shape and orientation to match the shape and orientation of the selected acceptance phase space intensity contour with a nonastigmatic lens and an appropriate drift space or drift spaces. This also alters the shape and orientation of the phase space in the other orthogonal plane. Then, an astigmatic lens and appropriate drift spaces are used to take the output light from the nonastigmatic lens and further alter the shape and orientation of the light in "other" orthogonal plane only, i.e., not affecting the phase space of the light in the first orthogonal plane, so as to alter the shape and orientation of the emittance phase space light in this plane to match as closely as possible the shape and orientation of the selected intensity contour of the acceptance phase space in the "other" orthogonal plane.

The optical tools which may be used, a proper combination of which must be made during the design process, are illustrated in FIG. 68. As seen in FIG. 68, symmetric or nonastigmatic lenses, cylindrical or astigmatic lens and higher order lens are available in addition to drift spaces. Drift spaces are to be considered an important optical component for use in the overall combination of elements. Also, note that an astigmatic or cylindrical lens affects the phase space of light in only one of the orthogonal planes and not the other. The general rule is that if the shape of the lens varies only in the X axis, it will have optical properties only in the X axis since the effect of this lens on the Y axis being only that of a flat slab of glass or plastic. The inverse is also true. The same separation of effects on different orthogonal planes can be achieved in higher order correction lenses also. These concepts are illustrated in FIGS. 69 and 70.

The first function to be performed by the optical system is to align the principal axis of the chosen emittance contour in both of the orthogonal planes with the principal axes of the chooses acceptance contours in the corresponding planes. This process is illustrated for two different situations in FIGS. 71 and 72. In FIG. 71, the orientation of the principal axes of the selected emittance phase space contours is the same in both orthogonal planes. A symmetric or nonastigmatic lens is chosen to operate on the emittance phase space in both orthogonal planes simultaneously to match the orientation of the principal axes to the orientation of the principal axes of the selected intensity contours of the acceptance phase space, which, in this case, have the same orientation.

FIG. 72 illustrates a different situation wherein the principal axes of the selected intensity contours of the acceptance phase space are not parallel but where the principal axes of the selected intensity contours of the emittance phase space are parallel. In such a situation, a cylindrical or astigmatic lens is used to alter the orientation of the principal axis of the selected intensity contour of the emittance phase space in the Y-Z plane while leaving the principal axis of the X-Z plane emittance phase space intensity contour unaffected. Note that the areas of the selected intensity contours of the emittance phase spaces in both orthogonal planes is not affected by passage through the lenses or drift spaces.

The second functional requirement of the optical system is to adjust the aspect ratio of the emittance contour to be similar to that of the acceptance contour. FIG. 73 illustrates how this is done. The acceptance phase space intensity contours of FIG. 73 all have the same principal axis orientation and the same areas but have different aspect ratios. Different lens and drift spaces combinations are used to alter the aspect ratio of the emittance phase space of FIG. 73a to match the aspect ratio of whatever acceptance phase space exists.

The final function of the optical system is to adjust for any curvature mismatch between the principal axes of the emittance and acceptance phase spaces. This is done using a higher order correction lens as is illustrated in FIG. 74. In the case shown, the higher order lens curves the principal axis of the selected intensity contour of the emittance phase space to match the curvature of the principal axis of the selected intensity contour of the acceptance phase space.

As noted above, the stages of this process can be performed in any order and a single lens or mirror can possibly be devised to do all the necessary phase space alterations in one step. The light so altered is then reflected or otherwise guided to the target device. If the target device is an optical fiber or optical waveguide of another type, the light is injected as a guided mode. Note also that the when a fiber optic waveguide is used, as one of the optical devices between which light is optically coupled by the method and apparatus of the invention, bending is not the only way to get light out of or into the fiber. It is also possible to get light into or out of the fiber core by other techniques such as by removing or replacing a section of the cladding with transparent material having a different index of refraction than that of the cladding. It is also possible to couple light into or out of the fiber core by way of evanescent coupling. The phase space techniques mentioned herein may have applicability to these technologies as well. Further, two astigmatic phase alteration steps may be used instead of a nonastigmatic step followed by an astigmatic step. For example, the selected X-Y emittance phase space component may be astigmatically altered in shape and orientation to match the shape and orientation of a selected intensity contour of the X-Y acceptance phase space. Then, the selected Y-Z emittance phase space component may be astigmatically altered in shape and orientation to match the shape and orientation of a selected intensity contour of the Y-Z acceptance phase space. Obviously, these steps may be performed in the reverse order.

Though the invention has been described by reference to certain preferred embodiments thereof, it is not to be limited thereby and is to be limited only by the appended claims.

We claim:

1. An apparatus for coupling light between a light emitting device and a target optical device, the light emitting device emitting light having an emittance intensity phase space plot on a reference surface representable by a first plurality of intensity contours, the target device having an acceptance intensity phase space plot on the reference surface representable by a second plurality of intensity contours defining those light rays which will be captured by the target device, comprising:
the light emitting device for emitting light;
the target optical device;
an optical path for guiding at least some of the emitted light to the target optical device;
means for altering a direction of propagation of the emitted light so that the altered emitted light has an altered emittance intensity phase space plot on the reference surface representable by a third plurality of intensity contours and so that a first major axis of the altered plot substantially overlaps a first major axis of the acceptance plot on a first plot plane.

2. The apparatus of claim 1, the target optical device comprising a bent optical fiber which is to have light from the light emitting device injected thereinto by passing the light through a side of the fiber.

3. The apparatus of claim 1, the light emitting device comprising a bent optical fiber which is bent about a radius of curvature sufficiently small and sector angle sufficiently large so that light propagating therewithin radiates outward at the bend by passing through a side of the fiber.

4. The apparatus of claim 1, the major axes being substantially aligned.

5. The apparatus of claim 1, the altering means altering the direction of the emitted light so that a first minor axis of the altered plot substantially overlaps a first minor axis of the acceptance plot, the first minor and major axes being substantially perpendicular to one another on the first plot plane.

6. The apparatus of claim 5, an aspect ratio of the first minor and major axes of the altered plot being substantially equal to an aspect ratio of the first minor and major axes of the acceptance plot.

7. The apparatus of claim 6, the altering means altering the direction of propagation of the emitted light so that the altered plot is mapped onto the acceptance plot and with their maximum intensities substantially coinciding.

8. The apparatus of claim 1, the altering means altering the direction of propagation of the emitted light so that a second major axis on the altered plot substantially overlaps a second major axis of the acceptance plot, the second major axes being located on a second plot plane, the second plot plane being orthogonal to the first plot plane.

9. The apparatus of claim 8, the altering means altering the direction of the emitted light so that a second minor axis of the altered plot substantially overlaps a second minor axis of the acceptance plot, the second minor axes being substantially perpendicular to the second major axes and being located on the second plot plane.

10. The apparatus of claim 9, an aspect ratio of the second minor and major axes of the altered plot being substantially equal to an aspect ratio of the second minor and major axes of the acceptance plot.

11. The apparatus of claim 8, the second major axes of the altered and acceptance plots being curved.

12. The apparatus of claim 1, the altering means including at least one third or higher order lens which imposes a third or higher order correction factor to the direction of propagation of the emitted light.

13. An apparatus for coupling light between a light emitting device and a target optical device, comprising:
the light emitting device for emitting light;
the target optical device;
an optical path for guiding at least some of the emitted light to the target optical device;
means for altering a direction of propagation of the emitted light, the altering means including at least one third or higher order corrective lens, at least one of the devices comprising a bent optical fiber whereby light passes through a side of the fiber at a bend.

14. The apparatus of claim 13, the light emitting device comprising the bent optical fiber.

15. The apparatus of claim 13, the target optical device comprising the bent optical fiber.

16. A telecommunications system, comprising:
at least one optical fiber;
a head end connected to the optical fiber;
an optical coupler connected to the optical fiber, the optical coupler bending the optical fiber so as to allow light to be coupled between an electro-optic device and a core of the bent optical fiber so as to allow signals to be transported between the electro-optic device and the head end, one of the electro-optic device and the bent optical fiber emitting light having an emittance intensity phase space plot on a reference surface representable by a first plurality of intensity contours, the other of the electro-optic device and the bent optical fiber having an acceptance intensity phase space plot on the reference surface representable by a second plurality of intensity contours defining those light rays which will be captured by the target device;
means for altering a direction of propagation of the emitted light so that the altered emitted light has an altered emittance intensity phase space plot on the reference surface representable by a third plurality of intensity contours and so that a first major axis of the altered plot substantially overlaps a first major axis of the acceptance plot on a first plot plane.

17. A method for coupling light between a light emitting device and a target optical device, the light emitting device emitting light having an emittance intensity phase space plot on a reference surface representable by a first plurality of intensity contours, the target device having an acceptance intensity phase space plot on the reference surface representable by a second plurality of intensity contours defining those light rays which will be captured by the target device, comprising the steps of:
guiding light emitted by the emitting device toward the target optical device;
altering a direction of propagation of the emitted light so that the altered emitted light has an altered emittance intensity phase space plot on the reference surface representable by a third plurality of intensity contours and so that a first major axis of the altered plot substantially overlaps a first major axis of the acceptance plot on a first plot plane.

18. The method of claim 17, the target optical device comprising a bent optical fiber which is to have light from the light emitting device injected thereinto by passing the light through a side of the fiber.

19. The method of claim 17, the light emitting device comprising a bent optical fiber which is bent about a radius of curvature sufficiently small and sector angle sufficiently large so that light propagating therewithin radiates outward at the bend by passing through a side of the fiber.

20. The method of claim 17, the step of altering altering the direction of the emitted light so that a first minor axis of the altered plot substantially overlaps a first minor axis of the acceptance plot, the first minor and major axes being substantially perpendicular to one another on the first plot plane.

21. The method of claim 20, an aspect ratio of the first minor and major axes of the altered plot being substantially equal to an aspect ratio of the first minor and major axes of the acceptance plot.

22. The method of claim 17, the step of altering the direction of propagation of the emitted light so that a second major axis on the altered plot substantially overlaps a second major axis of the acceptance plot, the second major axes being located on a second plot plane, the second plot plane being orthogonal to the first plot plane, the emitted light being altered so that a second minor axis of the altered plot substantially overlaps a second minor axis of the acceptance plot, the second minor axes being substantially perpendicular to the second major axes and being located on the second plot plane, an aspect ratio of the second minor and major axes of the altered plot being substantially equal to an aspect ratio of the second minor and major axes of the acceptance plot.

23. The method of claim 22, the second major axes of the altered and acceptance plots being curved.

24. The method of claim 17, the step of altering including using at least one third or higher order lens which imposes a third or higher order correction factor to the direction of propagation of the emitted light.

25. A method for coupling light between a light emitting device and a target optical device, comprising the steps of:
characterizing light emitted by the light emitting device so as to define an emittance intensity phase space plot representable by a first plurality of intensity contourson a reference surface;
characterizing for the target device an acceptance intensity phase space plot on the reference surface representable by a second plurality of intensity contours so as to define those light rays which will be captured by the target device;
guiding light emitted by the emitting device toward the target optical device;
altering a direction of propagation of the emitted light so that the altered emitted light has an altered emittance intensity phase space plot on the reference surface representable by a third plurality of intensity contours and so that the altered plot more closely conforms to the acceptance plot than does the emittance plot prior to such altering.

26. The method of claim 25, the target optical device comprising a bent optical fiber which is to have light from the light emitting device injection thereinto by passing the light through a side of the fiber.

27. The method of claim 25, the light emitting device comprising a bent optical fiber which is bent about a radius of curvature sufficiently small and sector angle sufficiently large so that light propagating therewithin radiates outward at the bend by passing through a side of the fiber.

* * * * *